(12) United States Patent
Kurian et al.

(10) Patent No.: US 9,828,532 B2
(45) Date of Patent: Nov. 28, 2017

(54) CROSSLINKABLE AND CROSSLINKED COMPOSITIONS

(71) Applicant: 3M INNOVATIVE PROPERTIES COMPANY, St. Paul, MN (US)

(72) Inventors: Anish Kurian, Woodbury, MN (US); Jason D. Clapper, Lino Lakes, MN (US); Ross E. Behling, Woodbury, MN (US); Megan P. Lehmann, Stillwater, MN (US); David J. Yarusso, Shoreview, MN (US); Babu N. Gaddam, Woodbury, MN (US); Mark F. Ellis, St. Paul, MN (US)

(73) Assignee: 3M INNOVATION PROPERTIES COMPANY, Saint Paul, MN (US)

( * ) Notice: Subject to any disclaimer, the term of this patent is extended or adjusted under 35 U.S.C. 154(b) by 293 days.

(21) Appl. No.: 14/442,600

(22) PCT Filed: Nov. 5, 2013

(86) PCT No.: PCT/US2013/068429
§ 371 (c)(1),
(2) Date: May 13, 2015

(87) PCT Pub. No.: WO2014/078123
PCT Pub. Date: May 22, 2014

(65) Prior Publication Data
US 2016/0289514 A1    Oct. 6, 2016

Related U.S. Application Data

(60) Provisional application No. 61/776,907, filed on Mar. 12, 2013, provisional application No. 61/728,027, filed on Nov. 19, 2012.

(51) Int. Cl.
| | | |
|---|---|---|
| *C08F 2/46* | (2006.01) | |
| *C08G 61/04* | (2006.01) | |
| *C09J 133/08* | (2006.01) | |
| *C09J 133/06* | (2006.01) | |
| *C09J 5/06* | (2006.01) | |
| *C09J 11/08* | (2006.01) | |

(52) U.S. Cl.
CPC ............ *C09J 133/08* (2013.01); *C09J 5/06* (2013.01); *C09J 11/08* (2013.01); *C09J 133/06* (2013.01); *C08L 2312/06* (2013.01); *C09J 2205/114* (2013.01); *C09J 2205/31* (2013.01)

(58) Field of Classification Search
CPC .... C09J 133/08; C09J 11/08; C09J 2205/114; C09J 5/06; C09J 2205/31; C09J 133/06; C08L 2312/06; C08L 33/06
USPC ................................................. 522/1; 520/1
See application file for complete search history.

(56) References Cited

U.S. PATENT DOCUMENTS

| | | |
|---|---|---|
| 5,637,646 A | 6/1997 | Ellis |
| 5,753,768 A | 5/1998 | Ellis |
| 5,804,610 A | 9/1998 | Hamer |
| 5,986,011 A | 11/1999 | Ellis |
| 6,294,249 B1 | 9/2001 | Hamer |
| 6,332,291 B1 | 12/2001 | Flosbach |
| 6,586,491 B2 | 7/2003 | Husemann |
| 6,855,386 B1 | 2/2005 | Daniels |
| 7,442,438 B2 | 10/2008 | Boulos |
| 7,838,110 B2 | 11/2010 | Zhu |
| 8,337,961 B2 | 12/2012 | Kim |
| 2001/0025083 A1 | 9/2001 | Stark |
| 2005/0129936 A1* | 6/2005 | Husemann ............ C09J 7/0217 428/343 |
| 2006/0036040 A1* | 2/2006 | Takeko .................. C09J 133/04 525/192 |
| 2006/0110596 A1 | 5/2006 | Palasz |
| 2007/0032577 A1 | 2/2007 | Kanzawa |
| 2007/0055006 A1 | 3/2007 | Kim |
| 2007/0276090 A1 | 11/2007 | Aoki |
| 2011/0028583 A1 | 2/2011 | Smith |
| 2011/0237725 A1 | 9/2011 | Clapper |
| 2012/0115976 A1 | 5/2012 | Igarashi |
| 2012/0172477 A1 | 7/2012 | Huang |
| 2012/0214896 A1 | 8/2012 | Igarashi |
| 2015/0184031 A1 | 7/2015 | Yurt |

FOREIGN PATENT DOCUMENTS

| | | |
|---|---|---|
| JP | 60-099183 | 6/1985 |
| JP | 2000-109771 | 4/2000 |
| JP | 2012/140497 | 7/2012 |
| WO | WO 2011/019520 | 2/2011 |
| WO | WO 2011/112508 | 9/2011 |

(Continued)

OTHER PUBLICATIONS

Pocius, "Adhesion and Adhesives Technology: An Introduction", Second Edition, Carl Hanser Verlag, Munich (2002), pp. 246-250.
Temel, "Photopolymerization and photophysical properties of amine linked benzophenone photoinitiator for free radical polymerization", Journal of Photochemistry and Photobiology A: Chemistry, 2011, vol. 219, pp. 26-31.
International Search Report for PCT International Application No. PCT/US2013/068429 dated Feb. 3, 2014, 4 pages.

*Primary Examiner* — Jessica E Whiteley
(74) *Attorney, Agent, or Firm* — Jean A. Lown

(57) ABSTRACT

Crosslinkable compositions, crosslinked compositions, articles containing these compositions, and methods of making the articles are provided. The crosslinkable compositions, which include two (meth)acrylate copolymers plus a tackifier, are used to form the crosslinked compositions upon exposure to ultraviolet radiation. The crosslinked compositions can function as pressure-sensitive adhesives. The crosslinkable compositions are well suited for use with hot melt processing methods.

15 Claims, No Drawings

(56) References Cited

FOREIGN PATENT DOCUMENTS

| | | |
|---|---|---|
| WO | WO 2011/119363 | 9/2011 |
| WO | WO 2012/044529 | 4/2012 |
| WO | WO 2012/082448 | 6/2012 |

* cited by examiner

US 9,828,532 B2

CROSSLINKABLE AND CROSSLINKED COMPOSITIONS

CROSS REFERENCE TO RELATED APPLICATIONS

This application is a national stage filing under 35 U.S.C. 371 of PCT/US2013/068429, filed Nov. 5, 2013, which claims priority to U.S. Provisional Application Nos. 61/776,907, filed Mar. 12, 2013 and 61/728,027, filed Nov. 19, 2012, the disclosures of which are incorporated by reference in their entireties herein.

TECHNICAL FIELD

A crosslinkable composition, a crosslinked composition formed by exposure of the crosslinkable composition to ultraviolet radiation, articles containing these compositions, and methods of making the articles are described.

BACKGROUND

Pressure-sensitive tapes are virtually ubiquitous in the home and workplace. In one of its simplest configuration, a pressure-sensitive tape includes a backing layer and an adhesive layer attached to the backing layer. According to the Pressure-Sensitive Tape Council, pressure-sensitive adhesives (PSAs) are known to possess properties including the following: (1) aggressive and permanent tack, (2) adherence with no more than finger pressure, (3) sufficient ability to hold onto an adherend, and (4) sufficient cohesive strength to be removed cleanly from the adherend. Materials that have been found to function well as PSAs include polymers designed and formulated to exhibit the requisite viscoelastic properties resulting in a desired balance of tack, peel adhesion, and shear holding power. PSAs are characterized by being normally tacky at room temperature (e.g., 20° C.). Materials that are merely sticky or adhere to a surface do not constitute a PSA; the term PSA encompasses materials with additional viscoelastic properties.

These requirements for pressure-sensitive adhesives are assessed generally by means of tests which are designed to individually measure tack, adhesion (peel strength), and cohesion (shear holding power), as noted by A. V. Pocius in *Adhesion and Adhesives Technology: An Introduction*, $2^{nd}$ Ed., Hanser Gardner Publication, Cincinnati, Ohio, 2002. These measurements taken together constitute the balance of properties often used to characterize a PSA.

One important class of pressure-sensitive adhesives include those with a (meth)acrylate copolymer as the elastomeric material. The (meth)acrylate copolymers can be used alone or can be combined with tackifiers to provide the desired adhesive properties. Tackifiers can be added, for example, to alter the rheology and compliance of the adhesive composition, to change the surface energy of the adhesive composition, and to alter the melt processing characteristics of the adhesive composition.

SUMMARY

Crosslinkable compositions, crosslinked compositions, articles containing these compositions, and methods of making the articles are provided. The crosslinkable compositions include two different (meth)acrylate copolymers plus a tackifier. At least one of the (meth)acrylate copolymers contains pendant aromatic groups that upon exposure to ultraviolet radiation result in the formation of crosslinks within the polymeric material. The crosslinked compositions can function as pressure-sensitive adhesives. Even with high levels of tackifiers, the pressure-sensitive adhesives typically exhibit high cohesive strength and shear holding performance.

In a first aspect, a crosslinkable composition is provided that contains 1) at least two different (meth)acrylate copolymers and 2) a tackifier. The (meth)acrylate copolymers include a first (meth)acrylate copolymer and a second (meth)acrylate copolymer. The first (meth)acrylate copolymer is a reaction product of a first monomer mixture comprising a) an alkyl(meth)acrylate and b) an optional UV crosslinking monomer having an aromatic group that is crosslinkable when exposed to ultraviolet radiation. The optional UV crosslinking monomer in the first monomer mixture is present in an amount in a range of 0 to 0.3 mole percent based on total moles of monomer in the first monomer mixture. The second (meth)acrylate copolymer has a weight average molecular weight greater than or equal to 100,000 Daltons. The second (meth)acrylate copolymer is a reaction product of a second monomer mixture that includes a) an alkyl(meth)acrylate and b) a UV crosslinking monomer having an aromatic group that is crosslinkable when exposed to ultraviolet radiation. The UV crosslinking monomer in the second monomer mixture is present in an amount equal to at least 1 mole percent based on total moles of monomer in the second monomer mixture. A total weight of the (meth)acrylate copolymers in kilograms divided by total moles of UV crosslinking monomer used to form the (meth)acrylate copolymers is no greater than 150 kilograms per mole. The tackifier is present in an amount equal to at least 20 weight percent based on a total weight of solids in the crosslinkable composition.

In a second aspect, an article is provided. The article includes a substrate and a coating of a crosslinkable composition positioned adjacent to the substrate. The crosslinkable composition is the same as described above.

In a third aspect, a crosslinked composition is provided. The crosslinked composition contains a reaction product of a crosslinkable composition exposed to ultraviolet radiation. The crosslinkable composition is the same as described above.

In a fourth aspect, an article is provided. The article includes a substrate and a coating of a crosslinked composition positioned adjacent to the substrate. The crosslinked composition contains a reaction product of a crosslinkable composition exposed to ultraviolet radiation. The crosslinkable composition is the same as described above.

In a fifth aspect, a method of making an article is provided. The method includes providing a substrate, positioning a crosslinkable composition adjacent to the substrate, and then exposing the crosslinkable composition to ultraviolet light to form a crosslinked composition. The crosslinkable composition is the same as described above.

DETAILED DESCRIPTION

Crosslinkable compositions, crosslinked compositions, articles containing these compositions, and methods of making the articles are provided. The crosslinkable compositions, which include two (meth)acrylate copolymers plus a tackifier, are used to form the crosslinked compositions upon exposure to ultraviolet radiation. The crosslinked compositions can function as pressure-sensitive adhesives. The crosslinkable compositions are well suited for use with hot melt processing methods.

Tackifiers have been added to many known pressure-sensitive adhesive compositions. Although tackifiers can improve the performance and versatility of some pressure-sensitive adhesives, high amounts of tackifier can decrease the efficacy of radical based crosslinking mechanisms. When the crosslinking reaction is initiated by exposure of a photoactive species (e.g., photocrosslinker) to ultraviolet (UV) radiation, the reduced efficacy may be due to both the attenuation of the UV radiation by the tackifier and the reaction of the tackifier with the crosslinking species before polymeric chains (i.e., polymeric chains of the elastomeric material) can be crosslinked. The result is that the presence of the tackifier can significantly decrease the cohesive strength and the shear holding power of the adhesive compositions.

The deficiencies of pressure-sensitive adhesive compositions containing tackifiers are addressed with the crosslinkable compositions and crosslinked compositions provided herein. The crosslinkable compositions includes a first (meth)acrylate copolymer, a second (meth)acrylate copolymer with a plurality of UV crosslinkable groups, and a tackifier. When the second (meth)acrylate copolymer has a sufficiently high molecular weight and a sufficiently high number of UV crosslinkable groups, adhesive compositions with good cohesive strength and shear holding power can be prepared even in the presence of a substantial amount of tackifier. Advantageously, the crosslinkable composition can be hot melt processed to form a crosslinkable coating on a substrate. The crosslinkable coating can subsequently be transformed to a crosslinked coating by exposure to UV radiation.

In a first aspect, a crosslinkable composition is provided that contains 1) at least two different (meth)acrylate copolymers and 2) a tackifier. The (meth)acrylate copolymers include a first (meth)acrylate copolymer and a second (meth)acrylate copolymer. The first (meth)acrylate copolymer is a reaction product of a first monomer mixture comprising a) an alkyl(meth)acrylate and b) an optional UV crosslinking monomer having an aromatic group that is crosslinkable when exposed to ultraviolet radiation. The optional UV crosslinking monomer in the first monomer mixture is present in an amount in a range of 0 to 0.3 mole percent based on total moles of monomer in the first monomer mixture. The second (meth)acrylate copolymer has a weight average molecular weight greater than or equal to 100,000 Daltons (100 kiloDaltons or 100 kDa or 100 kilograms per mole). The second (meth)acrylate copolymer is a reaction product of a second monomer mixture that includes a) an alkyl(meth)acrylate and b) a UV crosslinking monomer having an aromatic group that is crosslinkable when exposed to ultraviolet radiation. The UV crosslinking monomer in the second monomer mixture is present in an amount equal to at least 1 mole percent based on total moles of monomer in the second monomer mixture. A total weight of the two (meth)acrylate copolymers in kilograms divided by total moles of UV crosslinking monomer used to form the (meth)acrylate copolymers is no greater than 150 kilograms per mole. The tackifier is present in an amount equal to at least 20 weight percent based on a total weight of solids in the crosslinkable composition.

As used herein, the term "(meth)acrylate" refers to either a methacrylate or acrylate. In many embodiments, the (meth)acrylate is an acrylate.

As used herein, the terms "polymeric material" and "polymer" are used interchangeably to refer to a homopolymer, copolymer, terpolymer, and the like, or a mixture thereof. The term "copolymer" refers to a polymer prepared using two or more different monomers. The tackifier, which has a comparatively low molecular weight compared to the (meth)acrylate copolymers disclosed herein, usually is not considered to be a polymer in this context.

The term "and/or" such as in the expression A and/or B means either A alone or B alone or both A and B.

The terms "in a range of" or "in the range of" are used interchangeably to refer to all values within the range plus the endpoints of the range.

The first (meth)acrylate copolymer in the crosslinkable composition forms an elastomeric material upon crosslinking in the presence of the second (meth)acrylate copolymer. The first (meth)acrylate copolymer is a reaction product of a first monomer mixture that includes at least one alkyl (meth)acrylate monomer. The alkyl group can be linear (e.g., with 1 to 32 carbon atoms or 1 to 20 carbon atoms), branched (e.g., with 3 to 32 carbon atoms or 3 to 20 carbon atoms), cyclic (e.g., with 3 to 32 carbon atoms or 3 to 20 carbon atoms), or a combination thereof.

Exemplary alkyl(meth)acrylates include, but are not limited to, methyl(meth)acrylate, ethyl(meth)acrylate, n-propyl (meth)acrylate, isopropyl(meth)acrylate, n-butyl(meth)acrylate, isobutyl(meth)acrylate, n-pentyl(meth)acrylate, 2-methylbutyl(meth)acrylate, n-hexyl(meth)acrylate, cyclohexyl(meth)acrylate, 4-methyl-2-pentyl(meth)acrylate, 2-ethylhexyl(meth)acrylate, 2-methylhexyl(meth)acrylate, n-octyl(meth)acrylate, isooctyl(meth)acrylate, 2-octyl (meth)acrylate, isononyl(meth)acrylate, isoamyl(meth)acrylate, n-decyl(meth)acrylate, isodecyl(meth)acrylate, 2-propylheptyl(meth)acrylate, isotridecyl(meth)acrylate, isostearyl(meth)acrylate, octadecyl(meth)acrylate, 2-octyldecyl(meth)acrylate, dodecyl(meth)acrylate, lauryl(meth) acrylate, and heptadecanyl(meth)acrylate. Some exemplary branched alkyl(meth)acrylates are (meth)acrylic acid esters of Guerbet alcohols having 12 to 32 carbon atoms as described in PCT Patent Application Publication WO 2011/119363 (Clapper et al.).

The amount of alkyl(meth)acrylate is often at least 75 mole percent of the monomers in the first monomer mixture. For example, the first monomer mixture can contain at least 80 mole percent, at least 85 mole percent, at least 90 mole percent, or at least 95 mole percent alkyl(meth)acrylate based on total moles of monomer in the first monomer mixture.

The first monomer mixture often includes one or more optional polar monomers. As used herein, the term "polar monomer" refers to a monomer having a single ethylenically unsaturated group and a polar group. The polar group is often a hydroxyl group, an acidic group, a primary amido group, a secondary amido group, a tertiary amido group, an amino group, or an ether group (i.e., a group containing at least one alkylene-oxy-alkylene group of formula —R—O—R— where each R is an alkylene having 1 to 4 carbon atoms). The polar group can be in the form of a salt. For example, the acidic group can be in the form of an anion and can have a cationic counter ion. In many embodiments, the cationic counter ion is an alkaline metal ion (e.g., sodium, potassium, or lithium ion), an alkaline earth ion (e.g., calcium, magnesium, or strontium ion), an ammonium ion, or an ammonium ion substituted with one or more alkyl or aryl groups. The various amido or amino groups can be in the form of a cation and can have an anionic counter ion. In many embodiments, the anionic counter ion is a halide, acetate, formate, sulfate, phosphate, or the like.

Exemplary polar monomers with a hydroxyl group include, but are not limited to, hydroxyalkyl(meth)acrylates (e.g., 2-hydroxyethyl(meth)acrylate, 2-hydroxypropyl (meth)acrylate, 3-hydroxypropyl(meth)acrylate, and 4-hydroxybutyl(meth)acrylate), hydroxyalkyl(meth)acrylamides (e.g., 2-hydroxyethyl(meth)acrylamide or 3-hydroxypropyl (meth)acrylamide), ethoxylated hydroxyethyl(meth)acrylate (e.g., monomers commercially available from Sartomer (Exton, Pa., USA) under the trade designation CD570, CD571, and CD572), and aryloxy substituted hydroxyalkyl(meth) acrylates (e.g., 2-hydroxy-2-phenoxypropyl(meth)acrylate).

Exemplary polar monomers with an acidic group can be, for example, a carboxylic acid monomer, a phosphonic acid monomer, a sulfonic acid monomer, a salt thereof, or a combination thereof. Exemplary acidic monomers include, but are not limited to, (meth)acrylic acid, itaconic acid, fumaric acid, crotonic acid, citraconic acid, maleic acid, oleic acid, β-carboxyethyl acrylate, 2-(meth)acrylamidoethanesulfonic acid, 2-(meth)acrylamido-2-methylpropane sulfonic acid, vinylsulfonic acid, and the like. In many embodiments, the polar monomer is (meth)acrylic acid.

Exemplary polar monomers with a primary amido group include (meth)acrylamide. Exemplary polar monomers with secondary amido groups include, but are not limited to, N-alkyl(meth)acrylamides such as N-methyl(meth)acrylamide, N-ethyl(meth)acrylamide, N-isopropyl(meth)acrylamide, N-tert-octyl(meth)acrylamide, or N-octyl(meth)acrylamide. Exemplary polar monomers with a tertiary amido group include, but are not limited to, N-vinyl caprolactam, N-vinyl-2-pyrrolidone, (meth)acryloyl morpholine, and N,N-dialkyl(meth)acrylamides such as N,N-dimethyl(meth)acrylamide, N,N-diethyl(meth)acrylamide, N,N-dipropyl (meth)acrylamide, and N,N-dibutyl(meth)acrylamide.

Polar monomers with an amino group include various N,N-dialkylaminoalkyl(meth)acrylates and N,N-dialkylaminoalkyl(meth)acrylamides. Examples include, but are not limited to, N,N-dimethyl aminoethyl(meth)acrylate, N,N-dimethylaminoethyl(meth)acrylamide, N,N-dimethylaminopropyl(meth)acrylate, N,N-dimethylaminopropyl (meth) acrylamide, N,N-diethylaminoethyl(meth)acrylate, N,N-diethylaminoethyl(meth)acrylamide, N,N-diethylaminopropyl(meth)acrylate, and N,N-diethylaminopropyl(meth)acrylamide.

Exemplary polar monomers with an ether group include, but are not limited to, alkoxylated alkyl(meth)acrylates such as ethoxyethoxyethyl(meth)acrylate, 2-methoxyethyl(meth) acrylate, and 2-ethoxyethyl(meth)acrylate; and poly(alkylene oxide) (meth)acrylates such as poly(ethylene oxide) (meth)acrylates and poly(propylene oxide) (meth)acrylates. The poly(alkylene oxide) acrylates are often referred to as poly(alkylene glycol) (meth)acrylates. These monomers can have any suitable end group such as a hydroxyl group or an alkoxy group. For example, when the end group is a methoxy group, the monomer can be referred to as methoxy poly(ethylene glycol) (meth)acrylate.

In many embodiments, the first monomer mixture includes a polar monomer having an acidic group or a basic group. Monomers with basic groups are often nitrogen-containing monomers such as those with a primary amido group, secondary amido group, or amino group.

The polar monomer is often included in the first monomer mixture to enhance adhesion of the crosslinked composition (e.g., a coating of the crosslinked composition) to a substrate and to enhance the cohesive strength of the crosslinked composition. If present, the polar monomer can be included in an amount up to 25 mole percent based on total moles of monomer in the first monomer mixture. In many embodiments, the polar monomer is present in an amount up to 20 mole percent, up to 15 mole percent, or up to 10 mole percent based on total moles of monomer in the first monomer mixture. The first monomer mixture often contains at least 1 mole percent, at least 2 mole percent, at least 3 mole percent, at least 4 mole percent, or at least 5 mole percent polar monomer. The polar monomer can be present, for example, in an amount in the range of 0 to 25 mole percent, in the range 1 to 25 mole percent, in the range of 1 to 20 mole percent, in the range of 1 to 15 mole percent, in the range of 1 to 10 mole percent, or in the range of 2 to 10 mole percent based on total moles of monomer in the first monomer mixture.

Any other monomers compatible with (e.g., miscible with) the monomers in the first monomer mixture can be included. Examples of other monomers include various aryl (meth)acrylate (e.g., phenyl(meth)acrylate), vinyl ethers, vinyl esters (e.g., vinyl acetate), olefinic monomers (e.g., ethylene propylene, or butylene), styrene, styrene derivatives (e.g., alpha-methyl styrene), and the like. Still other example monomers are aryl substituted alkyl(meth)acrylates or alkoxy substituted alkyl(meth)acrylates such as 2-biphenylhexyl (meth)acrylate, benzyl (meth)acrylate, and 2-phenoxy ethyl(meth)acrylate. In many embodiments the (meth) acrylate is an acrylate. The first monomer mixture typically does not include a monomer with multiple (meth)acryloyl groups or multiple vinyl groups.

The first monomer mixture can optionally include a UV crosslinking monomer having an aromatic group that is crosslinkable when exposed to ultraviolet radiation. The aromatic group is often an aromatic ketone group. When exposed to UV radiation, the aromatic groups can abstract a hydrogen atom from another polymeric chain or another portion of the same polymeric chain. This abstraction results in the formation of crosslinks between polymeric chains or within the same polymeric chain. The aromatic group that is crosslinkable is often an aromatic ketone group. In many embodiments, the aromatic group is a derivative of benzophenone (i.e., a benzophenone-containing group). That is, the UV crosslinking monomers are often benzophenone-based monomers. Examples of UV crosslinking monomers include, but are not limited to, 4-(meth)acryloyloxybenzophenone, 4-(meth)acryloyloxyethoxybenzophenone, 4-(meth)acryloyloxy-4'-methoxybenzophenone, 4-(meth) acryloyloxyethoxy-4'-methoxybenzophenone, 4-(meth) acryloyloxy-4'-bromobenzophenone, 4-acryloyloxyethoxy-4'-bromobenzophenone, and the like.

The UV crosslinking monomer is often present in the first monomer mixture in an amount up to 0.3 mole percent (i.e., 0 to 0.3 mole percent) based on total moles of monomer. The amount is often limited when the polymerization reaction is initiated by exposure to UV radiation. That is, the UV crosslinkable monomer can cause undesired gelation during the polymerization process. In some examples, the UV crosslinking monomer can be up to 0.2 mole percent, up to 0.1 mole percent, or up to 0.05 mole percent based on total moles of monomer in the first monomer mixture.

Some first monomer mixtures include 75 to 100 mole percent alkyl(meth)acrylate, 0 to 25 mole percent polar monomer, and 0 to 0.3 mole percent UV crosslinking monomer. In some examples, the first monomer mixtures include 75 to 99 mole percent alkyl(meth)acrylate, 1 to 25 mole percent polar monomer, and 0 to 0.3 mole percent UV crosslinking monomer. In other examples, the first monomer mixtures include 85 to 99 mole percent alkyl(meth)acrylate, 1 to 15 mole percent polar monomer, and 0 to 0.3 mole percent UV crosslinking monomer. In still other examples, the first monomer mixtures include 90 to 99 mole percent alkyl(meth)acrylate, 1 to 10 mole percent polar monomer, and 0 to 0.3 mole percent UV crosslinking monomer. The amounts are based on total moles of monomer in the first monomer mixture.

In addition to the first monomer mixture, the first reaction mixture used to prepare the first (meth)acrylate copolymer typically includes a free radical initiator to commence polymerization of the monomers. The free radical initiator can be a photoinitator or a thermal initiator. Suitable thermal initiators include various azo compound such as those commercially available under the trade designation VAZO from E. I. DuPont de Nemours Co. (Wilminington, Del., USA) including VAZO 67, which is 2,2'-azobis(2-methylbutane nitrile), VAZO 64, which is 2,2'-azobis(isobutyronitrile), VAZO 52, which is (2,2'-azobis(2,4-dimethylpentanenitrile), and VAZO 88, which is 1,1'-azobis (cyclohexanecarbonitrile); various peroxides such as benzoyl peroxide, cyclohexane peroxide, lauroyl peroxide, di-tert-amyl peroxide, tert-butyl peroxy benzoate, di-cumyl peroxide, and peroxides commercially available from Atofina Chemical, Inc. (Philadelphia, Pa.) under the trade designation LUPERSOL (e.g., LUPERSOL 101, which is 2,5-bis(tert-butylperoxy)-2,5-dimethylhexane, and LUPERSOL 130, which is 2,5-dimethyl-2,5-di-(tert-butylperoxy)-3-hexyne); various hydroperoxides such as tert-amyl hydroperoxide and tert-butyl hydroperoxide; and mixtures thereof.

In many embodiments, a photoinitiator is used. Some exemplary photoinitiators are benzoin ethers (e.g., benzoin methyl ether or benzoin isopropyl ether) or substituted benzoin ethers (e.g., anisoin methyl ether). Other exemplary photoinitiators are substituted acetophenones such as 2,2-diethoxyacetophenone or 2,2-dimethoxy-2-phenylacetophenone (commercially available under the trade designation IRGACURE 651 from BASF Corp. (Florham Park, N.J., USA) or under the trade designation ESACURE KB-1 from Sartomer (Exton, Pa., USA)). Still other exemplary photoinitiators are substituted alpha-ketols such as 2-methyl-2-hydroxypropiophenone, aromatic sulfonyl chlorides such as 2-naphthalenesulfonyl chloride, and photoactive oximes such as 1-phenyl-1,2-propanedione-2-(O-ethoxycarbonyl) oxime. Other suitable photoinitiators include, for example, 1-hydroxycyclohexyl phenyl ketone (commercially available under the trade designation IRGACURE 184), bis(2,4,6-trimethylbenzoyl)phenylphosphineoxide (commercially available under the trade designation IRGACURE 819), 1-[4-(2-hydroxyethoxy)phenyl]-2-hydroxy-2-methyl-1-propane-1-one (commercially available under the trade designation IRGACURE 2959), 2-benzyl-2-dimethylamino-1-(4-morpholinophenyl)butanone (commercially available under the trade designation IRGACURE 369), 2-methyl-1-[4-(methylthio)phenyl]-2-morpholinopropan-1-one (commercially available under the trade designation IRGACURE 907), and 2-hydroxy-2-methyl-1-phenyl propan-1-one (commercially available under the trade designation DAROCUR 1173 from Ciba Specialty Chemicals Corp. (Tarrytown, N.Y., USA).

The first reaction mixture may optionally further contain a chain transfer agent to control the molecular weight of the resultant (meth)acrylate copolymer. Examples of useful chain transfer agents include, but are not limited to, carbon tetrabromide, alcohols (e.g., ethanol and isopropanol), mercaptans or thiols (e.g., lauryl mercaptan, butyl mercaptan, ethanethiol, isooctylthioglycolate, 2-ethylhexyl thioglycolate, 2-ethylhexyl mercaptopropionate, ethyleneglycol bisthioglycolate), and mixtures thereof. If used, the polymerizable mixture may include up to 0.5 weight percent of a chain transfer agent based on a total weight of monomers. For example, the first reaction mixture can contain 0.005 to 0.5 weight percent, 0.01 to 0.5 weight percent, 0.01 to 0.2 weight percent, or 0.01 to 0.1 weight percent chain transfer agent.

The polymerization of the first reaction mixture can occur in the presence or absence of an organic solvent. If an organic solvent is included in the polymerizable mixture, the amount is often selected to provide the desired viscosity. Examples of suitable organic solvents include, but are not limited to, methanol, tetrahydrofuran, ethanol, isopropanol, heptane, acetone, methyl ethyl ketone, methyl acetate, ethyl acetate, toluene, xylene, and ethylene glycol alkyl ether. Those solvents can be used alone or as mixtures thereof. In many embodiments, the polymerization occurs with little or no organic solvent present. That is the first reaction mixture is free of organic solvent or contains a minimum amount of organic solvent. If used, the organic solvent is often present in an amount less than 10 weight percent, less than 5 weight percent, less than 4 weight percent, less than 3 weight percent, less than 2 weight percent, or less than 1 weight percent based on the total weight of the first reaction mixture. If used, any organic solvent typically is removed at the completion of the polymerization reaction.

Although any known method of making (meth)acrylate copolymers can be used, in some embodiments it is desirable to minimize the use of organic solvents that will need to be removed later. One suitable method is to form the first (meth)acrylate within a polymeric pouch that has been purged to remove oxygen. This method, which is further described in U.S. Pat. No. 5,804,610 (Hamer et al.) and U.S. Pat. No. 6,294,249 (Hamer et al.), is particularly advantageous when the first (meth)acrylate copolymer is subsequently combined with the other components of the crosslinkable composition using hot melt processing methods.

In this polymerization method, the various components of the first reaction mixture can be sealed in a packaging material (e.g., polymeric pouch) that does not dissolve in the presence of the first reaction mixture and that is capable of transmitting ultraviolet radiation. The packaging material is usually selected to have a melting point at or below the processing temperature of the first (meth)acrylate copolymer, which is the temperature at which this material will flow. The packaging material often has a melting point no greater than 200° C., no greater than 175° C., or no greater than 150° C. The packaging material is often prepared from a flexible thermoplastic polymeric film of ethylene-vinyl acetate, ethylene-acrylic acid, polypropylene, polyethylene, polybutadiene, or ionomeric materials. The polymeric films often have a thickness of at least 0.01 millimeters, at least 0.02 millimeters, or at least 0.03 millimeters. The thickness is often up to 0.30 millimeters, up to 0.25 millimeters, up to 0.20 millimeters, up to 0.15 millimeters, or up to 0.10 millimeters. Thinner films are often desired to minimize the amount of the packaging material that is added into the crosslinkable composition. The amount of the packaging material is typically at least 0.5 weight percent of the total weight of the packaging material and the first reaction mixture. For example, this amount is often at least 1 weight percent, at least 2 weight percent, or even at least 3 weight percent. The amount can be up to 20 weight percent, up to 15 weight percent, up to 10 weight percent, or up to 5 weight percent based on the total weight of the packaging material and the first reaction mixture. In some embodiments, the amount is in a range of 1 to 20 weight percent, 1 to 10 weight percent, or 2 to 10 weight percent based on the total weight of the packaging material and the first reaction mixture.

The packaging material is often in the form of a polymeric pouch prepared from two lengths of thermoplastic film that are heat sealed together across the bottom and each lateral edge. The first reaction mixture is placed within the polymeric pouch and the polymeric pouch is then heat sealed across the top to completely surround the first reaction mixture. Prior to sealing the top of the polymeric pouch, it is typically desirable to remove as much air as possible. A small amount of air can be tolerated if the amount is not sufficient to substantially interfere with the polymerization reaction.

The polymerization of the first reaction mixture occurs upon exposure to UV radiation. Suitable UV sources often have at least 60 percent, at least 65 percent, at least 70 percent, or at least 75 percent of the emission spectra within the range of 280 to 400 nanometers and have an intensity within the range of 0.1 to 25 mW/cm$^2$. The temperature of the reaction mixture is often controlled by immersing the sealed polymeric pouch in a water bath or heat transfer fluid controlled at a temperature in a range of 5° C. to 50° C., in a range of 5° C. to 40° C., in a range of 5° C. to 30° C., or in a range of 5° C. to 20° C.

The resulting product of the polymerization reaction is the first (meth)acrylate copolymer, which is a random copolymer. This polymeric material often has a weight average molecular weight equal to at least 100,000 Daltons, at least 200,000 Daltons, at least 300,000 Daltons, at least 400,000 Daltons, at least 500,000 Daltons, or at least 600,000 Daltons. The weight average molecular weight can be up to 2,000,000 Daltons, up to 1,500,000 Daltons, or up to 1,000,000 Daltons. The weight average molecular weight can be varied, for example, by altering the amount of chain transfer agent included in the first reaction mixture.

The first (meth)acrylate copolymer typically has a glass transition temperature no greater than 20° C., no greater than 10° C., no greater than 0° C., no greater than −10° C., no greater than −20° C., no greater than −30° C., no greater than −40° C., or no greater than −50° C. The glass transition temperature can be measured using Differential Scanning calorimetry.

The amount of the first (meth)acrylate copolymer in the crosslinkable composition is often in a range of 80 to 98 weight percent based on a total weight of (meth)acrylate copolymer (e.g., the sum of the amount of the first (meth)acrylate copolymer plus the amount of the second (meth) acrylate copolymer). For example, the crosslinkable composition can include at least 80 weight percent, at least 85 percent, at least 90 weight percent, or at least 95 weight percent of the first (meth)acrylate copolymer. The amount of the first (meth)acrylate copolymer can be up to 98 weight percent, up to 97 weight percent, up to 96 weight percent, up to 95 weight percent, up to 94 weight percent, up to 93 weight percent, up to 92 weight percent, up to 91 weight percent, or up to 90 weight percent based on the total weight of (meth)acrylate copolymers in the crosslinkable composition.

In addition to the first (meth)acrylate copolymer, the crosslinkable composition further contains a second (meth)acrylate copolymer that is of a different composition than the first (meth)acrylate copolymer. In particular, the second (meth)acrylate copolymer is a reaction product of a second monomer mixture that includes (1) an alkyl(meth)acrylate, substituted alkyl(meth)acrylate, or a mixture thereof plus (2) a UV crosslinking monomer having an aromatic group that is crosslinkable with ultraviolet radiation. The UV crosslinking monomer is present in an amount equal to at least 1 mole percent based on total moles of monomer in the second monomer mixture.

The alkyl(meth)acrylates that are suitable for use in the second monomer mixture are the same as those described above for use in the first monomer mixture. The second monomer mixture can include up to 99 mole percent alkyl (meth)acrylate based on total moles of monomer in the second monomer mixture. For example, the second monomer mixture can contain up to 98 mole percent, up to 95 mole percent, up to 90 mole percent, up to 85 mole percent, up to 80 mole percent, or up to 75 mole percent alkyl(meth) acrylate.

The UV crosslinking monomer in the second monomer mixture is the same as that described above as an optional monomer in the first monomer mixture. Even if the UV crosslinking monomer is included in the first (meth)acrylate copolymer, it is present at a higher level in the second (meth)acrylate monomer. More specifically, the UV crosslinking monomer is present in amount equal to at least 1 mole percent based on total moles of monomer in the second monomer mixture. For example, the UV crosslinking monomer can be present in an amount equal to at least 2 mole percent, at least 3 mole percent, at least 4 mole percent, or at least 5 mole percent based on total moles of monomer in the second monomer mixture. The amount of the UV crosslinking monomer can be up to 10 mole percent or even higher, up to 8 mole percent, or up to 6 mole percent based on total moles of monomer in the second monomer mixture. In some embodiments, the amount of the UV crosslinking monomer is in a range of 1 to 10 mole percent, in a range of 2 to 10 mole percent, in a range of 3 to 10 mole percent, in a range of 4 to 10 mole percent, or in a range of 5 to 10 mole percent based on total moles of monomer in the second monomer mixture.

The UV crosslinking monomer includes an aromatic crosslinkable group that functions as a photocrosslinker when exposed to UV radiation. The aromatic groups are often aromatic ketone groups such as benzophenone derivatives and can abstract a hydrogen atom from another polymeric chain or another portion of the same polymeric chain. When the second (meth)acrylate copolymer is exposed to UV radiation in the presence of the first (meth)acrylate copolymer, this abstraction results in the crosslinking of the first (meth)acrylate compound and the formation of an elastomeric material. Examples of UV crosslinking monomers are benzophenone-containing monomers such as 4-(meth)acryloyloxybenzophenone, 4-(meth)acryloyloxyethoxybenzophenone, 4-(meth)acryloyloxy-4'-methoxybenzophenone, 4-(meth)acryloyloxyethoxy-4'-methoxybenzophenone, 4-(meth)acryloyloxy-4'-bromobenzophenone, 4-acryloyloxyethoxy-4'-bromobenzophenone, and the like.

In addition to the alkyl(meth)acrylate and the UV crosslinking monomer, the second monomer mixture can include optional monomers such as those described above for the first monomer mixture. For example, the second monomer mixture can include a polar monomer. Any polar monomer described for use in the first monomer mixture can be used in the second monomer mixture. If present, the amount of the polar monomer can be up to 25 mole percent based on total moles of monomer in the second monomer mixture. In many embodiments, the polar monomer is present in an amount up to 20 mole percent, up to 15 mole percent, or up to 10 mole percent based on the total moles of monomer in the second monomer mixture. The second monomer mixture often contains at least 1 mole percent, at least 2 mole percent, at least 3 mole percent, at least 4 mole percent, or at least 5 mole percent polar monomer. The polar monomer can be present, for example, in an amount in the range of 0 to 25 mole percent, 1 to 25 mole percent, in the range of 1 to 20 mole percent, in the range of 1 to 15 mole percent, in the range of 1 to 10 mole percent, or in the range of 2 to 10 mole percent based on total moles of monomer in the second monomer mixture.

In many embodiments, the second monomer mixture includes a polar monomer having an acidic group or a basic group. Monomers with basic groups are often nitrogen-containing monomers such as those with a primary amido group, secondary amido group, or amino group.

In some embodiments, it can be advantageous to use complementary polar monomers in the first (meth)acrylate copolymer and the second (meth)acrylate copolymer. For example, a monomer with an acidic group can be included in the first monomer mixture while a monomer with a basic group can be included in the second monomer mixture. Alternatively, a monomer with a basic group can be included in the first monomer mixture while a monomer with an acidic group can be included in the second monomer mixture. In some embodiments, the polar monomer with an acidic group is a (meth)acrylic acid monomer and the polar monomer with a basic group has an amido or amino group. The presence of these complementary polar monomers can increase the interactions between the two (meth)acrylate copolymers and facilitate effective crosslinking of the first (meth)acrylate copolymer by the second (meth)acrylate copolymer. Further, the presence of these complementary polar monomers can increase the cohesive strength of the crosslinked composition due to the attractive interaction (acid-base or hydrogen bonding interactions) between the two (meth)acrylate copolymers.

Any other monomers compatible with (e.g., miscible with) the monomers in the second monomer mixture can be included. Examples of other monomers include various aryl(meth)acrylate (e.g., phenyl(meth)acrylate), vinyl ethers, vinyl esters (e.g., vinyl acetate), olefinic monomers (e.g., ethylene propylene, or butylene), styrene, styrene derivatives (e.g., alpha-methyl styrene), and the like. The second monomer mixture typically does not include a monomer with multiple (meth)acryloyl groups or multiple vinyl groups. Still other example monomers are aryl substituted alkyl(meth)acrylates or alkoxy substituted alkyl(meth)acrylates such as 2-biphenylhexyl(meth)acrylate, benzyl(meth) acrylate, and 2-phenoxy ethyl(meth)acrylate. In many embodiments the (meth)acrylate is an acrylate. The first monomer mixture typically does not include a monomer with multiple (meth)acryloyl groups or multiple vinyl groups.

Some exemplary second monomer mixtures contain up to 99 mole percent alkyl(meth)acrylate and at least 1 mole percent UV crosslinking monomer based on total moles of monomer in the second monomer mixture. For example, the second monomer mixtures can contain up to 99 mole percent alkyl(meth)acrylate and 1 to 10 mole percent UV crosslinking monomer. In more specific examples, the second monomer mixture contains 65 to 99 mole percent alkyl(meth) acrylate, 1 to 10 mole percent UV crosslinking monomer, and 0 to 25 mole percent polar monomer.

Other exemplary second monomer mixtures contain up to 98 mole percent alkyl(meth)acrylate, at least 1 mole percent polar monomer, and at least 1 mole percent crosslinking monomer based on total moles of monomer in the second monomer mixture. In more specific examples, the second monomer mixture contains 65 to 98 mole percent alkyl (meth)acrylate, 1 to 25 mole percent polar monomer, and 1 to 10 mole percent crosslinking monomer. In even more specific examples, the second monomer mixture contains 75 to 98 mole percent alkyl(meth)acrylate, 1 to 15 mole percent polar monomer, and 1 to 10 mole percent crosslinking monomer. Even more specific examples include 80 to 97 mole percent alkyl(meth)acrylate, 1 to 10 mole percent polar monomer, and 2 to 10 mole percent crosslinking monomer.

To polymerize the second (meth)acrylate copolymer from the second monomer mixture, a second reaction mixture is prepared. The second reaction mixture typically includes the second monomer mixture plus a free radical initiator. The free radical initiator is typically selected to be a thermal initiator rather than a photoinitiator to prevent the premature crosslinking of the second (meth)acrylate copolymer in the absence of the first (meth)acrylate copolymer. That is, a thermal initiator is used to form the second (meth)acrylate copolymer having unreacted crosslinkable groups. The unreacted crosslinkable groups can then be subsequently reacted when exposed to UV radiation in the presence of the first (meth)acrylate copolymer. Any suitable thermal initiator or combinations of thermal initiators can be used in the second reaction mixture such as those described above for use in the first reaction mixture. The thermal initiator is often an azo compound, peroxide compound, or mixture of one or more of these compounds.

Other components can be added to the second reaction mixture used to form the second (meth)acrylate copolymer. In some embodiments, chain transfer agents such as those described above for use in the first reaction mixture can be added. The amount of the chain transfer agent can be up to 3 weight percent, up to 2 weight percent, up to 1 weight percent, or up to 0.5 weight percent based on a total weight of monomers. For example, the second reaction mixture can contain 0.005 to 3 weight percent, 0.01 to 3 weight percent, 0.01 to 2 weight percent, or 0.01 to 1 weight percent chain transfer agent.

Additionally, an organic solvent can be added if desired to control the viscosity of the second reaction mixture. In many embodiments, no organic solvent (i.e., the second reaction mixture is free of organic solvent) or only a minimum amount of the organic solvent is added. The amount of organic solvent is typically no greater than 10 weight percent, no greater than 8 weight percent, no greater than 5 weight percent, no greater than 3 weight percent, or no greater than 1 weight percent of the second reaction mixture. Any organic solvent used in the second reaction mixture is typically removed at the completion of the polymerization reaction. Suitable organic solvents include those described above for use in the first reaction mixture.

The second reaction mixture can be polymerized using any suitable method. The polymerization can occur in a single step or in multiple steps. That is, all or a portion of the monomers and/or thermal initiator may be charged into a suitable reaction vessel and polymerized. In some embodiments, there is an initial charge of monomers and thermal initiator followed by partial polymerization. Polymerization is completed after the addition of any remaining monomers and/or thermal initiator. Multiple polymerization steps can help narrow the polydispersity of the polymerized product (e.g., the amount of low molecular weight chains can be reduced), can help minimize or control the heat of reaction, and can allow for adjustment of the type and amount of monomer available during polymerization. In some embodiments, the second (meth)acrylate copolymer is prepared using an adiabatic process as described, for example, in U.S. Pat. No. 5,986,011 (Ellis et al.) and U.S. Pat. No. 5,637,646 (Ellis).

The second (meth)acrylate copolymer, which is a random copolymer, typically has a weight average molecular weight greater than or equal to 100,000 Daltons. In some embodiments, the weight average molecular weight is greater than or equal to 200,000 Daltons, greater than or equal to 400,000 Daltons, greater than or equal to 500,000 Daltons, greater than or equal to 550,000 Daltons, greater than or equal to 600,000 Dalton, or even greater than or equal to 650,000 Daltons. The average molecular weight is often up to 2,000,000 Daltons, up to 1,500,000 Daltons, up to 1,000,000 Daltons, or up to 900,000 Daltons.

The amount of the second (meth)acrylate copolymer in the crosslinkable composition is often in a range of 2 to 20 weight percent based on a total weight of (meth)acrylate copolymer (e.g., the weight of the first (meth)acrylate copolymer plus the weight of the second (meth)acrylate copolymer). For example, the crosslinkable composition can include at least 2 weight percent, at least 4 weight percent, at least 6 weight percent, at least 8 weight percent, or at least 10 weight percent of the second (meth)acrylate copolymer. The amount of the second (meth)acrylate copolymer can be up to 20 weight percent, up to 18 weight percent, up to 16 weight percent, up to 14 weight percent, or up to 12 weight percent based on the total weight of (meth)acrylate copolymers in the crosslinkable composition.

A total weight of the (meth)acrylate copolymers in kilograms divided by a total moles of UV crosslinker in the (meth)acrylate copolymers is no greater than 150 kilograms per mole. Stated differently, the sum of the weights of the first (meth)acrylate copolymer plus the second (meth)acrylate copolymer divided by the sum of the moles of UV crosslinking monomer used to form the first (meth)acrylate copolymer plus the second (meth)acrylate copolymer is no greater than 150 kilograms per mole. This is the inverse of the crosslink density of the (meth)acrylate copolymer. The lower this number, the greater is the amount of crosslinking. Higher crosslinking tends to result in enhanced cohesive strength. This value is often no greater than 140 kilograms per mole, no greater than 130 kilograms per mole, no greater than 120 kilograms per mole, no greater than 110 kilograms per mole, no greater than 100 kilograms per mole, no greater than 90 kilograms per mole, or no greater than 80 kilograms per mole.

In addition to the first (meth)acrylate copolymer and the second (meth)acrylate copolymer, the crosslinkable composition also includes a tackifier. The tackifier is typically selected to be miscible with the two (meth)acrylate copolymers. Either solid or liquid tackifiers can be added. Solid tackifiers generally have a number average molecular weight (Mn) of 10,000 grams per mole or less and a softening point above about 70° C. Liquid tackifiers are viscous materials that have a softening point of about 0° C. to about 70° C.

Suitable tackifying resins include rosin resins such as rosin acids and their derivatives (e.g., rosin esters); terpene resins such as polyterpenes (e.g., alpha pinene-based resins, beta pinene-based resins, and limonene-based resins) and aromatic-modified polyterpene resins (e.g., phenol modified polyterpene resins); coumarone-indene resins; and petroleum-based hydrocarbon resins such as C5-based hydrocarbon resins, C9-based hydrocarbon resins, C5/C9-based hydrocarbon resins, and dicyclopentadiene-based resins. These tackifying resins, if added, can be hydrogenated to lower their color contribution to the pressure-sensitive adhesive composition. Combinations of various tackifiers can be used, if desired. In many embodiments, the tackifier is a rosin ester or includes a rosin ester.

Tackifiers that are rosin esters are the reaction products of various rosin acids and alcohols. These include, but are not limited to, methyl esters of rosin acids, triethylene glycol esters of rosin acids, glycerol esters of rosin acids, and pentaertythritol esters of rosin acids. These rosin esters can be hydrogenated partially or fully to improve stability and reduce their color contribution to the pressure-sensitive adhesive composition. The rosin resin tackifiers are commercially available, for example, from Eastman Chemical Company (Kingsport, Tenn., USA) under the trade designations PERMALYN, STAYBELITE, and FORAL as well as from Newport Industries (London, England) under the trade designations NUROZ and NUTAC. A fully hydrogenated rosin resin is commercially available, for example, from Eastman Chemical Company under the trade designation FORAL AX-E. A partially hydrogenated rosin resin is commercially available, for example, from Eastman Chemical Company under the trade designation STAYBELITE-E.

Tackifiers that are hydrocarbon resins can be prepared from various petroleum-based feed stocks. These feedstocks can be aliphatic hydrocarbons (mainly C5 monomers with some other monomers present such as a mixture of trans-1, 3-pentadiene, cis-1,3-pentadiene, 2-methyl-2-butene, dicyclopentadiene, cyclopentadiene, and cyclopentene), aromatic hydrocarbons (mainly C9 monomers with some other monomers present such as a mixture of vinyl toluenes, dicyclopenetadiene, indene, methylstyrene, styrene, and methylindenes), or mixtures thereof. Tackifiers derived from C5 monomers are referred to as C5-based hydrocarbon resins while those derived from C9 monomers are referred to as C9-based hydrocarbon resins. Some tackifiers are derived from a mixture of C5 and C9 monomers or are a blend of C5-based hydrocarbon tackifiers and C9-based hydrocarbon tackifiers. These tackifiers can be referred to as C5/C9-based hydrocarbon tackifiers. Any of these resins can be partially or fully hydrogenated to improve their color and thermal stability.

The C5-based hydrocarbon resins are commercially available from Eastman Chemical Company under the trade designations PICCOTAC and EASTOTAC, from Cray Valley (Exton, Pa., USA) under the trade designation WINGTACK, from Neville Chemical Company (Pittsburg, Pa., USA) under the trade designation NEVTAC LX, and from Kolon Industries, Inc. (South Korea) under the trade designation HIKOREZ. The C5-based hydrocarbon resins are commercially available from Eastman Chemical with various degrees of hydrogenation under the trade designation EASTOTACK.

The C9-based hydrocarbon resins are commercially available from Eastman Chemical Company under the trade designation PICCO, KRISTLEX, PLASTOLYN, and PICCOTAC, and ENDEX, from Cray Valley (Exton, Pa., USA) under the trade designations NORSOLENE, from Ruetgers N.V. (Belgium) under the trade designation NOVAREZ, and from Kolon Industries, Inc. (South Korea) under the trade designation HIKOTAC. These resins can be partially or fully hydrogenated. Prior to hydrogenation, the C9-based hydrocarbon resins are often about 40 percent aromatic as measured by proton Nuclear Magnetic Resonance. Hydrogenated C9-based hydrocarbon resins are commercially available, for example, from Eastman Chemical under the trade designations REGALITE and REGALREX that are 50 to 100 percent (e.g., 50 percent, 70 percent, 90 percent, and 100 percent) hydrogenated. The partially hydrogenated resins typically have some aromatic rings.

Various C5/C9-based hydrocarbon tackifiers are commercially available from Arakawa (Germany) under the trade designation ARKON, from Zeon Corporation (Japan) under the trade designation QUINTONE, from Exxon Mobile Chemical (Houston, Tex.) under the trade designation ESCOREZ, and from Newport Industries (London, England) under the trade designations NURES and H-REZ.

Any of the tackifiers may be used in an amount equal to at least 20 weight percent based on a total weight of solids in the crosslinkable composition. As used herein, the term "solids" includes all materials other than water and organic solvents in the crosslinkable composition. The main contributors to the solids are the first (meth)acrylate copolymer, the second (meth)acrylate copolymer, and the tackifier. In some embodiments, the amount of tackifier is at least 25 weight percent, at least 30 weight percent, or at least 35 weight percent based on the total weight of solids in the crosslinkable composition. The amount of the tackifier can be up to 60 weight percent or even higher, up to 55 weight percent, up to 50 weight percent, up to 45 weight percent, or up to 40 weight percent based on the total weight of the solids in the crosslinkable composition. In some embodiments, the tackifier is present in an amount in a range of 20 to 60 weight percent, in a range of 30 to 60 weight percent, in a range of 20 to 50 weight percent, in a range of 30 to 50 weight percent, in a range of 20 to 45 weight percent, or in a range of 20 to 40 weight percent based on the total weight of solids in the crosslinkable composition.

Further optional components can be added to the crosslinkable composition such as, for example, heat stabilizers, antioxidants, antistatic agents, plasticizers, thickeners, fillers, pigments, dyes, colorants, thixotropic agents, processing aides, nanoparticles, fibers, and combinations thereof. Such additives, if present, usually contribute in total less than 10 weight percent, less than 5 weight percent, less than 3 weight percent, or less than 1 weight percent to the solids of the crosslinkable composition.

The first (meth)acrylate copolymer, the second (meth) acrylate copolymer, and the tackifier are blended together to form the crosslinkable composition. Any suitable method of blending these components together can be used. The blending method can be done in the presence or absence of an organic solvent. In many embodiments, it can be advantageous to form a crosslinkable composition free or substantially free of an organic solvent. As used in reference to the crosslinkable composition, the term "substantially free" means that the total solids of the crosslinkable composition is greater than 90 weight percent, greater than 95 weight percent, greater than 97 weight percent, greater than 98 weight percent, or greater than 99 weight percent based on a total weight of the crosslinkable composition.

In many embodiments, the blending methods include mixing the various components in a molten state. Such blending methods can be referred to as hot melt mixing methods or hot melt blending methods. Both batch and continuous mixing equipment can be used. Examples of batch methods for blending components of the crosslinkable composition include those using a BRABENDER (e.g., a BRABENDER PREP CENTER that is commercially available from C. W. Brabender Instruments, Inc. (South Hackensack, N.J., USA)) or BANBURY internal mixing and roll milling equipment, which is available from Farrel Co. (Ansonia, Conn., USA). Examples of continuous mixing methods include single screw extruding, twin screw extruding, disk extruding, reciprocating single screw extruding, and pin barrel single screw extruding. Continuous methods can utilize distributive elements, pin mixing elements, static mixing elements, and dispersive elements such as MADDOCK mixing elements and SAXTON mixing elements.

A single piece or multiple pieces of hot melt mixing equipment may be used to prepare the crosslinkable compositions. In some embodiments, it may be desirable to use more than one piece of hot melt mixing equipment. For example, a first extruder such as a single screw extruder can be used to hot melt process the first (meth)acrylate copolymer contained within a thermoplastic pouch. The output of the first extruder can be fed into a second extruder such as a twin screw extruder for hot melt mixing the first (meth) acrylate copolymer with the second (meth)acrylate copolymer, tackifier, or both.

The output of the hot melt mixing process is a blended crosslinkable composition. This blended crosslinkable composition can be applied as a coating to a substrate. If a batch apparatus is used, the hot melt blended crosslinkable composition can be removed from the apparatus and placed in a hot melt coater or extruder for coating onto a substrate. If an extruder is used, the hot melt blended crosslinkable composition can be directly extruded onto a substrate to form a coating.

The extruded coating is typically deposited on a substrate. Thus, in another aspect, an article is provided. The article includes a substrate and a coating of the crosslinkable composition positioned adjacent to the substrate. The crosslinkable composition is the same as described above and includes the first (meth)acrylate copolymer, the second (meth)acrylate copolymer, and the tackifier. As used herein, the term "adjacent" refers to a first layer positioned near the second layer. The first and second layers can be in contact or can be separated from each other by another layer. For example, a substrate can be positioned adjacent to the crosslinkable composition if the substrate contacts the crosslinkable composition or is separated from the crosslinkable composition by another layer such as a primer layer or surface modification layer that increases the adhesion of the crosslinkable composition to the substrate. The crosslinkable composition is typically applied as a coating to a major surface of the substrate and the article is a substrate coated with the crosslinkable composition.

The expression "coating of the crosslinkable composition" is used interchangeably with the expression "crosslinkable composition coating". Likewise, the expression "coating of the crosslinked composition" is used interchangeably with the expression "crosslinked composition coating".

Any suitable substrate can be used in the article. For example, the substrate can be flexible or inflexible and can be formed from a polymeric material, glass or ceramic material, metal, or combination thereof. Some substrates are polymeric films such as those prepared from polyolefins (e.g., polyethylene, polypropylene, or copolymers thereof), polyurethanes, polyvinyl acetates, polyvinyl chlorides, polyesters (polyethylene terephthalate or polyethylene naphthalate), polycarbonates, polymethyl(meth)acrylates (PMMA), ethylene-vinyl acetate copolymers, and cellulosic materials (e.g., cellulose acetate, cellulose triacetate, and ethyl cellulose). Other substrates are metal foils, nonwoven materials (e.g., paper, cloth, nonwoven scrims), foams (e.g., polyacrylic, polyethylene, polyurethane, neoprene), and the like. For some substrates, it may be desirable to treat the surface to improve adhesion to the crosslinked composition, crosslinked composition, or both. Such treatments include, for example, application of primer layers, surface modification layer (e.g., corona treatment or surface abrasion), or both.

In some embodiments, the substrate is a release liner. Release liners typically have low affinity for the crosslinkable composition or crosslinked composition. Exemplary release liners can be prepared from paper (e.g., Kraft paper) or other types of polymeric material. Some release liners are coated with an outer layer of a release agent such as a silicone-containing material or a fluorocarbon-containing material.

The crosslinkable composition coating can have any desired thickness that can be effectively crosslinked when exposed to ultraviolet radiation. In many embodiments, the crosslinkable composition coating has a thickness no greater than 20 mils (500 micrometers), no greater than 10 mils (250 micrometers), no greater than 5 mils (125 micrometers), no greater than 4 mils (100 micrometers), no greater than 3 mils (75 micrometers), or no greater than 2 mils (50 micrometers). The thickness is often at least 0.5 mils (12.5 micrometers) or at least 1 mil (25 micrometers). For example, the thickness of the crosslinkable composition coating can be in the range of 0.5 mils (2.5 micrometers) to 20 mils (500 micrometers), in the range of 0.5 mils (5 micrometers) to 10 mils (250 micrometers), in the range of 0.5 mils (12.5 micrometers) to 5 mils (125 micrometers), in the range of 1 mil (25 micrometers) to 3 mils (75 micrometers), or in the range of 1 mil (25 micrometers) to 2 mils (50 micrometers).

In other aspects, a crosslinked composition and an article containing the crosslinked composition are provided. The crosslinked composition is the reaction product of a crosslinkable composition exposed to ultraviolet radiation. The article includes a substrate and a crosslinked composition coating positioned adjacent to the substrate. The substrate and the crosslinkable composition used to form the crosslinked composition are the same as described above. Suitable ultraviolet radiation sources are the same as described above.

The crosslinked composition is typically a pressure-sensitive adhesive. Thus, articles with a coating of the crosslinked composition have a pressure-sensitive adhesive layer and can be used for many applications typical of such articles. The substrate adjacent to the pressure-sensitive layer can be selected depending on the particular application. For example, the substrate can be a sheeting material and the resulting article can provide decorative graphics or can be a reflective product. In other examples, the substrate can be label stock (the resulting article is a label with an adhesive layer) or tape backing (the resulting article is an adhesive tape). In yet other examples, the substrate can be a release liner and the resulting article can be a transfer tape. The transfer tape can be used to transfer the pressure-sensitive adhesive layer to another substrate or surface. Other substrates and surface include, for example, a panel (e.g., a metal panel such as an automotive panel) or a glass window.

Some articles are adhesive tapes. The adhesive tapes can be single-sided adhesive tapes with the crosslinkable composition attached to a single side of the tape backing or can be double-sided adhesive tape with a pressure-sensitive adhesive layer on both major surfaces of the tape backing. At least one of the two pressure-sensitive adhesive layers is the crosslinkable composition described above. Double-sided adhesive tapes are often carried on a release liner.

In spite of the high levels of tackifiers in the crosslinked composition, the shear strength at 70° C. is often greater than 10,000 minutes as measured using the test procedure described in the Examples below. This is believed to result, at least in part, from the relatively high molecular weight of the second (meth)acrylate copolymer (e.g., greater than or equal to 100,000 Daltons). The cohesive strength tends to increase with an increase in the molecular weight of the second (meth)acrylate copolymer. Additionally, high shear strength values can be attributable to the relatively high loading of pendant UV crosslinkable groups in the second (meth)acrylate copolymer (e.g., at least 1 mole percent based on total moles of monomer in the second monomer mixture), sufficient UV crosslinking groups in the (meth)acrylate copolymers (e.g., total weight of the (meth)acrylate copolymers in kilograms divided by a total moles of UV crosslinker in the (meth)acrylate copolymers is no greater than 150 kilograms per mole), and sufficient exposure to UV radiation to crosslink the first (meth)acrylate copolymer and the second (meth)acrylate copolymer.

In yet another aspect, a method of preparing an article is provided. The method includes providing a substrate, positioning a crosslinkable composition adjacent to the substrate, and then exposing the crosslinkable composition to ultraviolet light to form a crosslinked composition. The crosslinkable composition contains at least two different (meth)acrylate copolymers and a tackifier. The (meth)acrylate copolymers include a first (meth)acrylate copolymer and a second (meth)acrylate copolymer. The first (meth)acrylate copolymer is a reaction product of a first monomer mixture comprising a) an alkyl(meth)acrylate and b) an optional UV crosslinking monomer having an aromatic group that is crosslinkable when exposed to ultraviolet radiation. The optional UV crosslinking monomer in the first monomer mixture is present in an amount in a range of 0 to 0.3 mole percent based on total moles of monomer in the first monomer mixture. The second (meth)acrylate copolymer has a weight average molecular weight greater than or equal to 100,000 Daltons. The second (meth)acrylate copolymer is a reaction product of a second monomer mixture that includes a) an alkyl(meth)acrylate and b) a UV crosslinking monomer having an aromatic group that is crosslinkable when exposed to ultraviolet radiation. The UV crosslinking monomer in the second monomer mixture is present in an amount equal to at least 1 mole percent based on total moles of monomer in the second monomer mixture. A total weight of the (meth)acrylate copolymers in kilograms divided by total moles of UV crosslinking monomer used to form the (meth)acrylate copolymers is no greater than 150 kilograms per mole. The tackifier is present in an amount equal to at least 20 weight percent based on a total weight of solids in the crosslinkable composition.

In many embodiments of this method, the crosslinkable composition is positioned adjacent to the substrate by extruding the crosslinkable composition in a molten state. The various components of the crosslinkable composition are mixed together as a hot melt prior to extrusion. That is, the substrate is coated with the hot melt blended crosslinkable composition that exits the extruder. The extruded coating of the crosslinkable composition can be crosslinked upon exposure to UV radiation. Such methods allow the separation of the coating process from the crosslinking reactions needed to provide the good cohesive strength and shear holding power.

The coating process can be performed using (meth)acrylate copolymers that have little or no crosslinking. Such polymeric materials can easily flow under the typical hot melt processing conditions. Hot melt processing advantageously use no organic solvents or minimal organic solvents. Thus, such processing methods are environmentally desirable.

The crosslinking process (e.g., exposure of the coated crosslinkable composition to UV radiation) is continued until the amount of crosslinking is sufficient to provide at least some insoluble gel when the resulting crosslinked composition is analyzed according to the gel content test described in the in the Examples below. The percent insoluble gel is often at least 20 weight percent, at least 25 weight percent, at least 30 weight percent, at least 35 weight percent, or at least 40 weight percent of the crosslinked composition.

The amount of crosslinking in the crosslinked composition can be varied by altering the relative amounts of the first (meth)acrylate copolymer and the second (meth)acrylate copolymer. Changing this relative amount can result in either an increase or decrease in the amount of UV crosslinkable groups in the crosslinkable composition. The extent of crosslinking can be more easily adjusted compared to a composition containing a single (meth)copolymer having UV crosslinkable groups. In such as composition, altering the amount of crosslinking would typically necessitate the preparation of another (meth)copolymer with a different amount of UV crosslinkable groups.

Various embodiments of crosslinkable compositions, crosslinked compositions, articles containing these compositions, and methods of making the articles are provided.

Embodiment 1 is a crosslinkable composition that contains 1) at least two different (meth)acrylate copolymers and 2) a tackifier. The (meth)acrylate copolymers include a first (meth)acrylate copolymer and a second (meth)acrylate copolymer. The first (meth)acrylate copolymer is a reaction product of a first monomer mixture comprising a) an alkyl (meth)acrylate and b) an optional UV crosslinking monomer having an aromatic group that is crosslinkable when exposed to ultraviolet radiation. The optional UV crosslinking monomer in the first monomer mixture is present in an amount in a range of 0 to 0.3 mole percent based on total moles of monomer in the first monomer mixture. The second (meth)acrylate copolymer has a weight average molecular weight greater than or equal to 100,000 Daltons. The second (meth)acrylate copolymer is a reaction product of a second monomer mixture that includes a) an alkyl(meth)acrylate and b) a UV crosslinking monomer having an aromatic group that is crosslinkable when exposed to ultraviolet radiation. The UV crosslinking monomer in the second monomer mixture is present in an amount equal to at least 1 mole percent based on total moles of monomer in the second monomer mixture. A total weight of the (meth)acrylate copolymers in kilograms divided by total moles of UV crosslinking monomer used to form the (meth)acrylate copolymers is no greater than 150 kilograms per mole. The tackifier is present in an amount equal to at least 20 weight percent based on a total weight of solids in the crosslinkable composition.

Embodiment 2 is the crosslinkable composition of embodiment 1, wherein the first (meth)acrylate copolymer is present in an amount in a range of 80 to 98 weight percent and the second (meth)acrylate copolymer is present in an amount in a range of 2 to 20 weight percent based on a total weight of (meth)acrylate copolymers in the crosslinkable composition.

Embodiment 3 is the crosslinkable composition of embodiment 1 or 2, wherein the weight average molecular weight of the second (meth)acrylate copolymer is greater than 500,000 Daltons.

Embodiment 4 is the crosslinkable composition of any one of embodiments 1 to 3, wherein the crosslinking monomer is a benzophenone-containing monomer.

Embodiment 5 is the crosslinkable composition of any one of embodiments 1 to 4, wherein the first monomer mixture further comprises a polar monomer, the second monomer mixture further comprises a polar monomer, or both.

Embodiment 6 is the crosslinkable composition of any one of embodiments 1 to 5, wherein the UV crosslinking monomer in the first monomer mixture is present in an amount in a range of 0.01 to 0.3 based on total moles of monomer in the first monomer mixture.

Embodiment 7 is the crosslinkable composition of any one of embodiments 1 to 6, wherein the tackifier comprises a rosin ester.

Embodiment 8 is the crosslinkable composition of any one of embodiments 1 to 7, wherein the first monomer mixture comprises 75 to 100 mole percent alkyl(meth)acrylate, 0 to 25 mole percent polar monomer, and 0 to 0.3 mole percent UV crosslinking monomer.

Embodiment 9 is the crosslinkable composition of any one of embodiments 1 to 8, wherein the second monomer mixture comprises 65 to 99 mole percent alkyl(meth)acrylate, 0 to 25 mole percent polar monomer, and 1 to 10 mole percent crosslinking monomer.

Embodiment 10 is the crosslinkable composition of any one of embodiments 1 to 9, wherein the crosslinkable composition comprises 20 to 60 weight percent tackifier based on the total weight of solids in the crosslinkable composition.

Embodiment 11 is an article that includes a substrate and a coating of a crosslinkable composition positioned adjacent to the substrate. The crosslinkable composition contains 1) at least two different (meth)acrylate copolymers and 2) a tackifier. The (meth)acrylate copolymers include a first (meth)acrylate copolymer and a second (meth)acrylate copolymer. The first (meth)acrylate copolymer is a reaction product of a first monomer mixture comprising a) an alkyl (meth)acrylate and b) an optional UV crosslinking monomer having an aromatic group that is crosslinkable when exposed to ultraviolet radiation. The optional UV crosslinking monomer in the first monomer mixture is present in an amount in a range of 0 to 0.3 mole percent based on total moles of monomer in the first monomer mixture. The second (meth)acrylate copolymer has a weight average molecular weight greater than or equal to 100,000 Daltons. The second (meth)acrylate copolymer is a reaction product of a second monomer mixture that includes a) an alkyl(meth)acrylate and b) a UV crosslinking monomer having an aromatic group that is crosslinkable when exposed to ultraviolet radiation. The UV crosslinking monomer in the second monomer mixture is present in an amount equal to at least 1 mole percent based on total moles of monomer in the second monomer mixture. A total weight of the (meth)acrylate copolymers in kilograms divided by total moles of UV crosslinking monomer used to form the (meth)acrylate copolymers is no greater than 150 kilograms per mole. The tackifier is present in an amount equal to at least 20 weight percent based on a total weight of solids in the crosslinkable composition.

Embodiment 12 is the article of embodiment 11, wherein the first (meth)acrylate copolymer is present in an amount in a range of 80 to 98 weight percent and the second (meth)acrylate copolymer is present in an amount in a range of 2 to 20 weight percent based on a total weight of (meth)acrylate copolymers in the crosslinkable composition.

Embodiment 13 is the article of embodiment 11 or 12, wherein the weight average molecular weight of the second (meth)acrylate copolymer is greater than 500,000 Daltons.

Embodiment 14 is the article of any one of embodiments 11 to 13, wherein the crosslinking monomer is a benzophenone-containing monomer.

Embodiment 15 is the article of any one of embodiments 11 to 14, wherein the first monomer mixture further comprises a polar monomer, the second monomer further comprises a polar monomer, or both.

Embodiment 16 is the article of any one of embodiments 11 to 15, wherein the UV crosslinking monomer in the first monomer mixture is present in an amount in a range of 0.01 to 0.3 based on total moles of monomer in the first monomer mixture.

Embodiment 17 is the article of any one of embodiments 11 to 16, wherein the tackifier comprises a rosin ester.

Embodiment 18 is the article of any one of embodiments 11 to 17, wherein the first monomer mixture comprises 75 to 100 mole percent alkyl(meth)acrylate, 0 to 25 mole percent polar monomer, and 0 to 0.3 mole percent UV crosslinking monomer.

Embodiment 19 is the article of any one of embodiments 11 to 18, wherein the second monomer mixture comprises 65 to 99 mole percent alkyl(meth)acrylate, 0 to 25 mole percent polar monomer, and 1 to 10 mole percent crosslinking monomer.

Embodiment 20 is the article of any one of embodiments 11 to 19, wherein the crosslinkable composition comprises 20 to 60 weight percent tackifier based on the total weight of solids in the crosslinkable composition.

Embodiment 21 is a crosslinked composition comprising a reaction product of a crosslinkable composition exposed to ultraviolet radiation. The crosslinkable composition contains 1) at least two different (meth)acrylate copolymers and 2) a tackifier. The (meth)acrylate copolymers include a first (meth)acrylate copolymer and a second (meth)acrylate copolymer. The first (meth)acrylate copolymer is a reaction product of a first monomer mixture comprising a) an alkyl (meth)acrylate, and b) an optional UV crosslinking monomer having an aromatic group that is crosslinkable when exposed to ultraviolet radiation. The optional UV crosslinking monomer in the first monomer mixture is present in an amount in a range of 0 to 0.3 mole percent based on total moles of monomer in the first monomer mixture. The second (meth)acrylate copolymer has a weight average molecular weight greater than or equal to 100,000 Daltons. The second (meth)acrylate copolymer is a reaction product of a second monomer mixture that includes a) an alkyl(meth)acrylate and b) a UV crosslinking monomer having an aromatic group that is crosslinkable when exposed to ultraviolet radiation. The UV crosslinking monomer in the second monomer mixture is present in an amount equal to at least 1 mole percent based on total moles of monomer in the second monomer mixture. A total weight of the (meth) acrylate copolymers in kilograms divided by total moles of UV crosslinking monomer used to form the (meth)acrylate copolymers is no greater than 150 kilograms per mole. The tackifier is present in an amount equal to at least 20 weight percent based on a total weight of solids in the crosslinkable composition.

Embodiment 22 is the crosslinked composition of embodiment 21, wherein the first (meth)acrylate copolymer is present in an amount in a range of 80 to 98 weight percent and the second (meth)acrylate copolymer is present in an amount in a range of 2 to 20 weight percent based on a total weight of (meth)acrylate copolymers in the crosslinkable composition.

Embodiment 23 is the crosslinked composition of embodiment 21 or 22, wherein the weight average molecular weight of the second (meth)acrylate copolymer is greater than 500,000 Daltons.

Embodiment 24 is the crosslinked composition of any one of embodiments 21 to 23, wherein the crosslinking monomer is a benzophenone-containing monomer.

Embodiment 25 is the crosslinked composition of any one of embodiments 21 to 24, wherein the first monomer mixture further comprises a polar monomer, the second monomer further comprises a polar monomer, or both.

Embodiment 26 is the crosslinked composition of any one of embodiments 21 to 25, wherein the UV crosslinking monomer in the first monomer mixture is present in an amount in a range of 0.01 to 0.3 based on total moles of monomer in the first monomer mixture.

Embodiment 27 is the crosslinked composition of any one of embodiments 21 to 26, wherein the tackifier comprises a rosin ester.

Embodiment 28 is the crosslinked composition of any one of embodiments 21 to 27, wherein the first monomer mixture comprises 75 to 100 mole percent alkyl(meth)acrylate, 0 to 25 mole percent polar monomer, and 0 to 0.3 mole percent UV crosslinking monomer.

Embodiment 29 is the crosslinked composition of any one of embodiments 21 to 28, wherein the second monomer mixture comprises 65 to 99 mole percent alkyl(meth)acrylate, 0 to 25 mole percent polar monomer, and 1 to 10 mole percent crosslinking monomer.

Embodiment 30 is the crosslinked composition of any one of embodiments 21 to 29, wherein the crosslinkable composition comprises 20 to 60 weight percent tackifier based on the total weight of solids in the crosslinkable composition.

Embodiment 31 is the crosslinked composition of any one of embodiment 21 to 30, wherein the crosslinked composition is a pressure-sensitive adhesive.

Embodiment 32 is an article that includes a substrate and a coating of a crosslinked composition positioned adjacent to the substrate. The crosslinked composition comprises a reaction product of a crosslinkable composition exposed to ultraviolet radiation. The crosslinkable composition contains 1) at least two different (meth)acrylate copolymers and 2) a tackifier. The (meth)acrylate copolymers include a first (meth)acrylate copolymer and a second (meth)acrylate copolymer. The first (meth)acrylate copolymer is a reaction product of a first monomer mixture comprising a) an alkyl (meth)acrylate, and b) an optional UV crosslinking monomer having an aromatic group that is crosslinkable when exposed to ultraviolet radiation. The optional UV crosslinking monomer in the first monomer mixture is present in an amount in a range of 0 to 0.3 mole percent based on total moles of monomer in the first monomer mixture. The second (meth)acrylate copolymer has a weight average molecular weight greater than or equal to 100,000 Daltons. The second (meth)acrylate copolymer is a reaction product of a second monomer mixture that includes a) an alkyl(meth)acrylate, and b) a UV crosslinking monomer having an aromatic group that is crosslinkable when exposed to ultraviolet radiation. The UV crosslinking monomer in the second monomer mixture is present in an amount equal to at least 1 mole percent based on total moles of monomer in the second monomer mixture. A total weight of the (meth) acrylate copolymers in kilograms divided by total moles of UV crosslinking monomer used to form the (meth)acrylate copolymers is no greater than 150 kilograms per mole. The tackifier is present in an amount equal to at least 20 weight percent based on a total weight of solids in the crosslinkable composition.

Embodiment 33 is the article of embodiment 32, wherein the crosslinked composition is a pressure-sensitive adhesive.

Embodiment 34 is the article of embodiment 32 or 33, wherein the article is an adhesive tape.

Embodiment 35 is the article of embodiment 32 or 33, wherein the substrate is a release liner and the article is a transfer tape.

Embodiment 36 is the article of any one of embodiments 32 to 35, wherein the first (meth)acrylate copolymer is present in an amount in a range of 80 to 98 weight percent and the second (meth)acrylate copolymer is present in an amount in a range of 2 to 20 weight percent based on a total weight of (meth)acrylate copolymers in the crosslinkable composition.

Embodiment 37 is the article of any one of embodiments 32 to 36, wherein the weight average molecular weight of the second (meth)acrylate copolymer is greater than 500,000 Daltons.

Embodiment 38 is the article of any one of embodiments 32 to 37, wherein the crosslinking monomer is a benzophenone-containing monomer.

Embodiment 39 is the article of any one of embodiments 32 to 38, wherein the first monomer mixture further comprises a polar monomer, the second monomer further comprises a polar monomer, or both.

Embodiment 40 is the article of any one of embodiments 32 to 39, wherein the UV crosslinking monomer in the first monomer mixture is present in an amount in a range of 0.01 to 0.3 based on total moles of monomer in the first monomer mixture.

Embodiment 41 is the article of any one of embodiments 32 to 40, wherein the tackifier comprises a rosin ester.

Embodiment 42 is the article of any one of embodiments 32 to 41, wherein the first monomer mixture comprises 75 to 100 mole percent alkyl(meth)acrylate, 0 to 25 mole percent polar monomer, and 0 to 0.3 mole percent UV crosslinking monomer.

Embodiment 43 is the article of any one of embodiments 32 to 42, wherein the second monomer mixture comprises 65 to 99 mole percent alkyl(meth)acrylate, 0 to 25 mole percent polar monomer, and 1 to 10 mole percent crosslinking monomer.

Embodiment 44 is the article of any one of embodiments 32 to 43, wherein the crosslinkable composition comprises 20 to 60 weight percent tackifier based on the total weight of solids in the crosslinkable composition.

Embodiment 45 is a method of making an article. The method includes providing a substrate, positioning a crosslinkable composition adjacent to the substrate, and then exposing the crosslinkable composition to ultraviolet light to form a crosslinked composition. The crosslinkable composition contains 1) at least two different (meth)acrylate copolymers and 2) a tackifier. The (meth)acrylate copolymers include a first (meth)acrylate copolymer and a second (meth)acrylate copolymer. The first (meth)acrylate copolymer is a reaction product of a first monomer mixture comprising a) an alkyl (meth)acrylate, and b) an optional UV crosslinking monomer having an aromatic group that is crosslinkable when exposed to ultraviolet radiation. The optional UV crosslinking monomer in the first monomer mixture is present in an amount in a range of 0 to 0.3 mole percent based on total moles of monomer in the first monomer mixture. The second (meth)acrylate copolymer has a weight average molecular weight greater than or equal to 100,000 Daltons. The second (meth)acrylate copolymer is a reaction product of a second monomer mixture that includes a) an alkyl(meth)acrylate, and b) a UV crosslinking monomer having an aromatic group that is crosslinkable when exposed to ultraviolet radiation. The UV crosslinking monomer in the second monomer mixture is present in an amount equal to at least 1 mole percent based on total moles of monomer in the second monomer mixture. A total weight of the (meth)acrylate copolymers in kilograms divided by total moles of UV crosslinking monomer used to form the (meth)acrylate copolymers is no greater than 150 kilograms per mole. The tackifier is present in an amount equal to at least 20 weight percent based on a total weight of solids in the crosslinkable composition.

Embodiment 46 is the method of embodiment 45, wherein the crosslinked composition is a pressure-sensitive adhesive.

Embodiment 47 is the method of embodiment 45 or 46, wherein the article is an adhesive tape.

Embodiment 48 is the method of embodiment 45 or 46, wherein the substrate is a release liner and the article is a transfer tape.

Embodiment 49 is the method of any one of embodiments 45 to 48, wherein the first (meth)acrylate copolymer is present in an amount in a range of 80 to 98 weight percent and the second (meth)acrylate copolymer is present in an amount in a range of 2 to 20 weight percent based on a total weight of (meth)acrylate copolymers in the crosslinkable composition.

Embodiment 50 is the method of any one of embodiments 45 to 49, wherein the weight average molecular weight of the second (meth)acrylate copolymer is greater than 500,000 Daltons.

Embodiment 51 is the method of any one of embodiments 45 to 50, wherein the crosslinking monomer is a benzophenone-containing monomer.

Embodiment 52 is the method of any one of embodiments 45 to 51, wherein the first monomer mixture further comprises a polar monomer, the second monomer further comprises a polar monomer, or both.

Embodiment 53 is the method of any one of embodiments 45 to 52, wherein the UV crosslinking monomer in the first monomer mixture is present in an amount in a range of 0.01 to 0.3 based on total moles of monomer in the first monomer mixture.

Embodiment 54 is the method of any one of embodiments 45 to 53, wherein the tackifier comprises a rosin ester.

Embodiment 55 is the method of any one of embodiments 45 to 54, wherein the first monomer mixture comprises 75 to 100 mole percent alkyl(meth)acrylate, 0 to 25 mole percent polar monomer, and 0 to 0.3 mole percent UV crosslinking monomer.

Embodiment 56 is the method of any one of embodiments 45 to 55, wherein the second monomer mixture comprises 65 to 99 mole percent alkyl(meth)acrylate, 0 to 25 mole percent polar monomer, and 1 to 10 mole percent crosslinking monomer.

Embodiment 57 is the method of any one of embodiments 45 to 56, wherein the crosslinkable composition comprises 20 to 60 weight percent tackifier based on the total weight of solids in the crosslinkable composition.

Embodiment 58 is the method of any one of embodiments 45 to 57, wherein positioning the crosslinkable substrate comprises extruding the crosslinkable composition.

Embodiment 59 is the method of any one of embodiments 45 to 58, wherein the first (meth)acrylate copolymer, the second (meth)acrylate copolymer, and the tackifier are blended together using hot melt processing conditions.

Embodiment 60 is the method of any one of embodiments 45 to 59, wherein the second (meth)acrylate copolymer is prepared using an adiabatic process.

Embodiment 61 is the crosslinkable composition of any one of embodiments 1 to 10, wherein the first reaction mixture further comprises a polar monomer having an acid group and the second monomer mixture further comprises a polar monomer having a basic group or wherein the first reaction mixture further comprises a polar monomer having a basic group and the second monomer mixture further comprises a polar monomer having an acidic group.

Embodiment 62 is the article of any one of embodiments 11 to 20, wherein the first reaction mixture further comprises a polar monomer having an acid group and the second monomer mixture further comprises a polar monomer having a basic group or wherein the first reaction mixture further comprises a polar monomer having a basic group and the second monomer mixture further comprises a polar monomer having an acidic group.

Embodiment 63 is the crosslinked composition of any one of embodiments 21 to 31, wherein the first reaction mixture further comprises a polar monomer having an acid group and the second monomer mixture further comprises a polar monomer having a basic group or wherein the first reaction mixture further comprises a polar monomer having a basic group and the second monomer mixture further comprises a polar monomer having an acidic group.

Embodiment 64 is the article of any one of embodiments 32 to 44, wherein the first reaction mixture further comprises a polar monomer having an acid group and the second monomer mixture further comprises a polar monomer having a basic group or wherein the first reaction mixture further comprises a polar monomer having a basic group and the second monomer mixture further comprises a polar monomer having an acidic group.

Embodiment 65 is the method of any one of methods 45 to 60, wherein the first reaction mixture further comprises a polar monomer having an acid group and the second monomer mixture further comprises a polar monomer having a basic group or wherein the first reaction mixture further comprises a polar monomer having a basic group and the second monomer mixture further comprises a polar monomer having an acidic group.

EXAMPLES

Test Methods
Determination of Molecular Weight Distribution

The molecular weight distribution of the compounds was characterized using conventional gel permeation chromatography (GPC). The GPC instrumentation, which was obtained from Waters Corporation (Milford, Mass., USA), included a high pressure liquid chromatography pump (Model 1515HPLC), an auto-sampler (Model 717), a UV detector (Model 2487), and a refractive index detector (Model 2410). The chromatograph was equipped with two 5 micron PLgel MIXED-D columns, which are available from Varian Inc. (Palo Alto, Calif., USA).

Samples of polymeric solutions were prepared by dissolving polymer or dried polymer materials in tetrahydrofuran at a concentration of 0.5 percent (weight/volume) and filtering through a 0.2 micron polytetrafluoroethylene filter that is available from VWR International (West Chester, Pa., USA). The resulting samples were injected into the GPC and eluted at a rate of 1 milliliter per minute through the columns maintained at 35° C. The system was calibrated with polystyrene standards using a linear least squares fit analysis to establish a calibration curve. The weight average molecular weight (Mw) and the polydispersity index (weight average molecular weight divided by number average molecular weight) were calculated for each sample against this standard calibration curve.

Determination of Adhesive Shear Strength

Shear tests were conducted using 12.7 millimeter (mm) wide adhesive tapes prepared in the Examples. A stainless steel panel was cleaned by wiping with acetone and drying. The adhesive tapes were applied to the panel such that a 12.7 mm by 25.4 mm portion of each adhesive tape was in firm contact with the panel and one end portion of each adhesive tape was free (e.g., not attached to the panel). A 500 gram weight was attached to the free end of the adhesive tape sample and the panel was held in a rack so that the panel formed an angle of 180° with the extended free end and the weight. The test was conducted at approximately 70° C. and the time elapsed in minutes for each adhesive tape to separate from the test panel was recorded as shear strength. Two shear tests were performed for each adhesive tape sample and the results averaged.

Determination of Peel Adhesion Force

Peel adhesion force was measured using adhesive tapes prepared in the Examples. A stainless steel panel was cleaned by wiping with acetone and drying. Adhesive tapes measuring 12.7 mm wide by 10 to 12 cm long were adhered to the panel by rolling with a 2 kg hard rubber roller 2 times. The free end of the adhesive tape was doubled back so that the angle of removal was 180° and attached to the horizontal arm of an adhesion tester scale (Slip/peel tester model 3M90, obtained from Instrumentors Inc. Strongsville, Ohio, USA). The stainless steel plate was attached to the platform that moved at 12 inches per minute (30.5 centimeters per minute) away from the scale. The peel test was started immediately after the adhesive tape was applied to the test panel. The scale was read in Newtons during the test as an average of the peak and minimum forces during the peel. This number was then converted to ounces per width of the adhesive tape sample (ounces per 0.5 inches, oz./0.5 in.). Three peel tests were run for each sample and averaged to yield the reported peel force.

Determination of Gel Content

A 1.5 inch by 1.5 inch sample of the adhesive tape (adhesive layer on a tape backing) was cut out using a square die, weighed, and adhered to the center of a pre-weighed rectangular mesh (4 inch by 2.5 inch). The mesh was McNICHOLS Quality Wire Mesh (square weave, stainless steel type 304, woven construction, 325 mesh, 0.0014 inch wire, and 0.0017 inch opening). The overhanging portion of the mesh was folded inwards to cover and immobilize the tape inside the mesh. The folded mesh with the inside tape was immersed in 30 milliliters of toluene inside a glass jar for 24 hours. The mesh with the adhesive was then taken out of the jar and dried in an oven for 30 minutes at 120° C. and weighed again to calculate the sample mass. The same procedure was repeated on an identical sized (1.5 inch by 1.5 inch) tape backing (Mitsubishi 3SAB) and the gelled insoluble portion (percent gel content) of the adhesive layer was calculated using the following equation.

$$(1-(((\text{Tape+Mesh initial})-(\text{Tape+Mesh final}))\pm ((\text{Tape+Mesh Initial})-(\text{Mesh}))))\times 100$$

Materials Used

Table 1 includes a list of materials used in the preparatory examples, comparative examples, and examples below. Any other materials used without identification of a supplier are typically available from multiple suppliers.

TABLE 1

Material List

| Chemical Name | Supplier |
| --- | --- |
| Isooctyl Acrylate (IOA) | Aldrich (St. Louis, MO, USA) |
| Acrylic Acid (AA) | Alfa Aesar (Heysham, England) |
| Isooctyl thioglycolate (IOTG) | Aldrich (St. Louis, MO, USA) |
| Ethylene Glycol Bisthioglycolate (EGBTG) | Evans Chemitics (Teaneck NJ, USA) |

TABLE 1-continued

Material List

| Chemical Name | Supplier |
| --- | --- |
| Acryloyloxy Benzophenone (ABP) | Prepared using a method similar to that described in Temel et al., *Journal of Photochemistry and Photobiology A: Chemistry*, 219, 26-31 (2011) |
| Acryloyloxyethyl Benzophenone | Prepared using a method similar to that described in U.S. Pat. No. 7,838,110 B2 (Zhu et al.) |
| 2,2-dimethoxy-2-phenylacetophenone (IRGACURE 651) (I-651) | BASF (Florham Park, NJ, USA) |
| 2,2'-Azobis(2,4-dimethylpentanenitrile) (VAZO 52) | DuPont (Wilmington, DE, USA) |
| 1,1'-Azobis(cyanocyclohexane) (VAZO 88) | DuPont (Wilmington, DE, USA) |
| 2,5-bis(tert-butylperoxy)-2,5-dimethylhexane (LUPERSOL 101) | Atofina Chemical, Inc. (Philadelphia, PA, USA) |
| 2,5-Dimethyl-2,5-di-(tert-butylperoxy)-3-hexyne (LUPERSOL 130) | Atofina Chemical, Inc. (Philadelphia, PA, USA) |
| Hydroquinone monomethyl ether (MeHQ) | Aldrich (St. Louis, MO, USA) |
| Rosin ester (FORAL 3085) | Pinova (Brunswick, GA, USA) |
| Antioxidant (IRGANOX 1010) | BASF (Florham Park, NJ, USA) |
| Acrylamide (Acm) | Dia-Nitrix (Tokyo, Japan) |
| N,N-Dimethylacylamide (NNDMA) | Aldrich (St. Louis, MO, USA) |
| Isopropyl alcohol (IPA) | Aldrich (St. Louis, MO, USA) |
| Ethyl acetate (EtOAc) | Aldrich (St. Louis, MO, USA) |
| 2-ethyl hexyl acrylate (2EHA) | BASF (Florham Park, NJ, USA) |

Preparatory Examples P1, P2, P3, P18 and P19: First (Meth)acrylate Copolymers B1-B5

For Preparatory Example 1, a curable composition was prepared by blending 190 grams of isooctyl acrylate, 10 grams of acrylic acid, 0.04 grams of isooctyl thioglycolate (IOTG), and 0.3 grams of photoinitiator (IRGACURE 651) on a stirrer plate to ensure good dissolution. A receptacle was prepared for the curable composition by heat sealing 0.065 millimeter thick clear poly(ethylene vinyl acetate) film (PVA film) to form an open ended container measuring 18 centimeters by 5 centimeters. The poly(ethylene vinyl acetate) film was obtained under the trade designation VA-24 from Flint Hills Resources (Wichita, Kans., USA). The receptacle was filled with approximately 26 grams of the curable composition. Air was forced out of the open end which was then heat sealed using a Midwest Pacific Impulse Sealer from J.J. Elemer Corp. (St. Louis, Mo., USA). The curable compositions were polymerized by immersing the sealed receptacle in a constant temperature water bath at 17° C. and irradiating with ultraviolet light (365 nm, 4 mW/cm$^2$) for eight minutes on each side.

Preparatory Examples P2, P3, P18, and P19 were prepared using a procedure similar to that described above for Preparatory Example P1. The content of each curable composition is shown in Table 2 below.

TABLE 2

Formulations for Preparation of First (Meth)acrylate Copolymers

| Preparatory Example | First (Meth)acrylate Copolymer | IOA (wt %) | 2-EHA (wt %) | AA (wt %) | ABP (wt %) | IOTG (wt %) | I-651 (wt %) |
| --- | --- | --- | --- | --- | --- | --- | --- |
| P1 | B1 | 94.8 | — | 5.0 | — | 0.02 | 0.15 |
| P2 | B2 | 94.7 | — | 5.0 | 0.1 | 0.02 | 0.15 |
| P3 | B3 | 95.1 | — | 4.48 | 0.2 | 0.03 | 0.15 |
| P18 | B4 | — | 94.7 | 5.0 | 0.15 | 0.02 | 0.15 |
| P19 | B5 | 94.7 | — | 5.0 | 0.15 | 0.03 | 0.15 |

Preparatory Example 4: Second (Meth)acrylate Copolymers PC1

The following components were charged to an 8 ounce glass jar: 82.91 grams isooctyl acrylate (IOA), 5.0 grams acrylic acid (AA), 3.20 grams of 23.4 weight percent 4-acryloyloxybenzophenone (ABP) in ethyl acetate, 0.10 grams IRGANOX 1010, 3.40 grams of 5.95 weight percent isooctyl thioglycolate (IOTG) in IOA, and 0.82 grams of 2.44 weight percent hydroquinone monomethyl ether (MeHQ) in IOA. The mixture was agitated until all components were dissolved. Then, 1.44 grams of 0.25 weight percent solids VAZO 52 in IOA was added to the glass jar. A portion (80 grams) of the final solution was then transferred to a stainless steel reaction vessel. The reaction mixture was purged of oxygen, heated to the induction temperature of 61° C., and polymerized under adiabatic conditions. The reaction temperature peaked at 126° C. and was allowed to cool back to less than 80° C. before being depressurized. A sample was taken of the reaction mixture and the unreacted monomer was 56.34 percent based on the total weight of the mixture.

The following components were charged to a 4 ounce glass jar: 5.0 grams IOTG, 1.0 grams VAZO 52, 0.10 grams VAZO 88, 0.05 grams LUPERSOL 101, 0.15 grams LUPERSOL 130, and 43.70 grams ethyl acetate. The solution was shaken in a reciprocating mixer until all solids were dissolved. Then, 0.7 grams of this ethyl acetate solution and 6.73 grams of 23.4 weight percent ABP in ethyl acetate were added to the stainless steel reaction vessel and stirred into the reaction mixture. The mixture was purged of oxygen, warmed to the induction temperature of 59° C., and polymerized under adiabatic conditions. The reaction temperature peaked at 142° C. and was isothermally held at that temperature for 60 minutes. A sample was taken of the reaction mixture and the unreacted monomer was 8.81 percent based on the total weight of the mixture. The product of Preparatory Example 4 (P4) is referred to as Polymeric Crosslinker 1 (PC1).

Preparatory Example 5: Second (Meth)acrylate Copolymer PC2

The following components were added to a 5 liter stainless steel reaction vessel: 2132 grams isooctyl acrylate (IOA), 125.0 grams acrylic acid (AA), 50.0 grams 4-acryloyl ethoxy benzophenone (AeBP), 2.50 grams IRGANOX 1010, 100 grams of 20 weight percent isooctyl thioglycolate (IOTG) in IOA, 20.50 grams of 2.44 weight percent hydroquinone monomethyl ether (MeHQ) in IOA, and 18.05 grams of 0.25 weight percent solids VAZO 52 in IOA were added to the stainless steel reaction vessel and mechanically stirred. The mixture was purged of oxygen, warmed to the induction temperature of 61° C., pressurized to 6 psi with nitrogen, and polymerized under adiabatic reaction conditions. The temperature peaked at 123° C. A sample was taken of the reaction mixture and the unreacted monomer was 63.5 percent based on the total weight of the mixture.

The following components were charged to a 4 ounce glass jar: 20.0 grams IOTG, 1.0 grams VAZO 52, 0.1 grams VAZO 88, 0.05 grams LUPERSOL 101, 0.15 grams LUPERSOL 130, and 28.25 grams ethyl acetate. The solution was shaken in a reciprocating mixer until all solids were dissolved. Then 25.0 grams of this ethyl acetate solution and 75.0 grams AeBP mixed with 25 grams IOA and 25 grams ethyl acetate were added to the stainless steel reaction vessel and mechanically stirred. The mixture was purged of oxygen, warmed to the induction temperature of 59° C., and polymerized under adiabatic conditions. The reaction peaked at 137° C. The mixture was then heated to 160° C. and then isothermally held at that temperature for 60 minutes before being partially stripped of residual monomers under vacuum. A sample was taken of the reaction mixture and the unreacted monomer was 8.38 percent based on the total weight of the mixture. The product of Preparatory Example 5 (P5) is referred to as Polymeric Crosslinker 2 (PC2).

Preparatory Example 6: Second (Meth)acrylate Copolymers PC3

The following components were charged to an 8 ounce glass jar: 92.92 grams isooctyl acrylate (IOA), 5.0 grams acrylic acid (AA), 3.50 grams of 50 weight percent 4-acryloyl ethoxy benzophenone (AeBP) in ethyl acetate, 0.10 grams IRGANOX 1010 antioxidant, 0.85 grams of 5.9 weight percent isooctyl thioglycolate (IOTG) in IOA, and 0.82 grams of 2.44 weight percent hydroquinone monomethyl ether (MeHQ) in IOA. The mixture was agitated until all components were dissolved. Then 0.48 grams of 0.25 weight percent solids VAZO 52 in IOA was added to the glass jar. A portion (80 grams) of the final solution was then transferred to a stainless steel reaction vessel. The mixture was purged of oxygen, warmed to the induction temperature of 61° C., and polymerized under adiabatic conditions. The temperature peaked at 125° C. A sample was taken of the reaction mixture and the unreacted monomer was 53.80 percent based on the total weight of the mixture The following components were charged to a 4 ounce glass jar: 1.25 grams IOTG, 1.0 grams VAZO 52, 0.10 grams VAZO 88, 0.05 grams LUPERSOL 101, 0.15 grams LUPERSOL 130, and 47.45 grams ethyl acetate. The solution was shaken in a reciprocating mixer until all solids were dissolved. Then 0.7 grams of this ethyl acetate solution and 4.55 grams of 50 weight percent AeBP in ethyl acetate were added to the stainless steel reaction vessel and stirred. The mixture was purged of oxygen, warmed to the induction temperature of 59° C., and polymerized under adiabatic conditions. The temperature peaked at 142° C. and was isothermally held at that temperature for 60 minutes before being drained from the reaction vessel. A sample was taken of the reaction mixture and the unreacted monomer was 8.97 weight based on the total weight of the mixture. The product of Preparatory Example 6 (P6) is referred to as Polymeric Crosslinker 3 (PC3).

Preparatory Example 7: Second (Meth)acrylate Copolymers PC4

The following components were added to a 5 liter stainless steel reaction vessel: 2209.5 grams isooctyl acrylate (IOA), 125.0 grams acrylic acid (AA), 50.0 grams 4-acryloyl ethoxy benzophenone (AeBP), 2.50 grams IRGANOX 1010 antioxidant, 3.13 grams of 20 weight percent isooctyl thioglycolate (IOTG) in IOA, 20.50 grams of 2.44 weight percent hydroquinone monomethyl ether (MeHQ) in IOA, and 18.05 grams of 0.25 weight percent solids VAZO 52 were added to the stainless steel reaction vessel and mechanically stirred. The mixture was purged of oxygen, warmed to the induction temperature of 61° C., pressurized to 6 psi with nitrogen, and polymerized under adiabatic reaction conditions. The temperature peaked at 136° C. The reactor was allowed to cool back to 50° C. before being depressurized. A sample was taken of the reaction mixture and the unreacted monomer was 57.56 percent based on the total weight of the mixture.

The following components were charged to a 4 ounce glass jar: 0.63 grams IOTG, 1.0 grams VAZO 52, 0.1 grams VAZO 88, 0.05 grams LUPERSOL 101, 0.15 grams LUPERSOL 130, and 48.07 grams ethyl acetate. The mixture was shaken in a reciprocating mixer until all solids were dissolved. Then 25.0 grams of the resulting ethyl acetate solution and 75.0 grams AeBP were added to the stainless steel reaction vessel and mechanically stirred. The reaction vessel was then resealed and The reactor contents were heated to 59° C. while purging with nitrogen. Upon reaching induction temperature, the vessel was pressurized to 6 psi. The reaction proceeded under adiabatic conditions and the temperature peaked at 131° C. The reaction mixture was then held isothermally at that temperature for 60 minutes. The reaction mixture was then partially stripped of residual monomers under vacuum. The remaining polymer was drained from the reaction vessel into 3 pound silicone lined boxes. The product of Preparatory Example 7 (P7) is referred to as Polymeric Crosslinker 4 (PC4).

Preparatory Example 8: Second (Meth)acrylate Copolymers PC5

The following components were charged to an 8 ounce glass jar: 93.24 grams isooctyl acrylate (IOA), 5.0 grams acrylic acid (AA), 4.0 grams of 50 weight percent 4-acryloyl ethoxy benzophenone (AeBP) in ethyl acetate, 0.10 grams IRGANOX 1010, 0.34 grams of 5.9 weight percent isooctyl thioglycolate (IOTG) in IOA, and 0.82 grams of 2.44 weight percent hydroquinone monomethyl ether (MeHQ) in IOA. The mixture was agitated until all components were dissolved. Then 0.48 grams of 0.25 weight percent solids VAZO 52 in IOA was added to the glass jar. A portion (80 grams) of the final solution was then transferred to a stainless steel reaction vessel. The reaction vessel was sealed and purged of oxygen with nitrogen while heating. Upon reaching the induction temperature of 61° C., the nitrogen purge was stopped and the vessel was pressurized to 60 psi with nitrogen. The temperature peaked at 132° C. A sample was taken of the reaction mixture and the unreacted monomer was 57.97 percent based on the total weight of the mixture.

The following components were charged to a 4 ounce glass jar: 0.5 grams IOTG, 1.0 grams VAZO 52, 0.10 grams VAZO 88, 0.05 grams LUPERSOL 101, 0.15 grams LUPERSOL 130, and 48.20 grams ethyl acetate. The solution was shaken in a reciprocating mixer until all solids were dissolved. Then 0.7 grams of the ethyl acetate solution and 4.2 grams of 50 weight percent AeBP in ethyl acetate were added to the stainless steel reaction vessel and stirred with a wooden tongue depressor. The reaction vessel was then resealed, purged of oxygen with nitrogen, and purged with nitrogen while the reaction vessel was heated to the induction temperature of 59° C. The nitrogen purge was stopped and the vessel was pressurized to 60 psi. The mixture polymerized adiabatically and the temperature peaked at 150° C. The mixture was isothermally held at that temperature for 60 minutes. The reaction mixture was drained from the reaction vessel into an 8 ounce jar. The product of Preparatory Example 8 (P8) is referred to as Polymeric Crosslinker 5 (PC5).

Preparatory Example 9: Second (Meth)acrylate Copolymer PC6

The following components were added to o a 5 liter stainless steel reaction vessel: 2084.20 grams isooctyl acrylate (IOA), 125.0 grams acrylic acid (AA), 100.0 grams 4-acryloyl ethoxy benzophenone (AeBP), 2.50 grams IRGANOX 1010 antioxidant, 3.50 grams of 20 weight percent isooctyl thioglycolate (IOTG) in IOA, 20.50 grams of 2.44 weight percent hydroquinone monomethyl ether (MeHQ) in IOA, and 18.05 grams of 0.25 weight percent solids VAZO 52 in IOA were added to the stainless steel reaction vessel and mechanically stirred. The mixture was purged of oxygen, warmed to the induction temperature of 61° C., pressurized to 6 psi with nitrogen, and polymerized under adiabatic reaction conditions. The temperature peaked at 136° C. The reactor was allowed to cool back to 50° C. before being depressurized. A sample was taken of the reaction mixture and the unreacted monomer was 53.22 weight percent based on the total weight of the mixture.

The following components were charged to a 4 ounce glass jar: 0.70 grams IOTG, 1.0 grams VAZO 52, 0.1 grams VAZO 88, 0.05 grams LUPERSOL 101, 0.15 grams LUPERSOL 130, and 48.0 grams ethyl acetate. The solution was shaken in a reciprocating mixer until all solids were dissolved. Then 25.0 grams of this ethyl acetate solution and 150.0 grams AeBP were added to the stainless steel reaction vessel and mechanically stirred. The mixture was purged of oxygen with nitrogen, heated to induction temperature of 59° C., and then allowed to polymerize adiabatically. The reaction temperature peaked at 154° C. and was isothermally held at that temperature for 60 minutes. The reaction mixture was then partially stripped of residual monomers under vacuum. The remaining polymer was drained from the reaction vessel into 3 pound silicone lined boxes. The product of Preparatory Example 9 (P9) is referred to as Polymeric Crosslinker 6 (PC6).

Preparatory Example 10: Second (Meth)acrylate Copolymers PC7

The following components were charged to an 8 ounce glass jar: 90.52 grams IOA, 5.0 grams AA, 4.00 grams of 50 weight percent AeBP in ethyl acetate, 0.10 grams IRGANOX 1010, 3.40 grams of 5.9 weight percent IOTG in IOA, and 0.82 grams of 2.44 weight percent MeHQ in IOA. The mixture was agitated until all components were dissolved. Then 0.48 grams of 0.25 weight percent solids VAZO 52 in IOA was added to the glass jar. A portion (80 grams) of the final solution was then transferred to a stainless steel reaction vessel. The reaction vessel was sealed and purged of oxygen with nitrogen while heating. Upon reaching the induction temperature of 61° C., the nitrogen purge was stopped and the vessel was pressurized to 60 psi with nitrogen. The temperature peaked at 132° C. A sample was taken of the reaction mixture and the unreacted monomer was 55.21 percent based on the total weight of the mixture.

The following components were charged to a 4 ounce glass jar: 1.0 grams VAZO 52, 0.10 grams VAZO 88, 0.10 grams LUPERSOL 101, 0.30 grams LUPERSOL 130, and 48.50 grams ethyl acetate. The solution was shaken in a reciprocating mixer until all solids were dissolved. Then 0.7 grams of the ethyl acetate solution, 1.13 grams of 5.9 weight percent IOTG in IOA and 4.2 grams of 50 weight percent AeBP in ethyl acetate were added to the stainless steel reaction vessel and stirred with a wooden tongue depressor. The reaction vessel was then resealed, purged of oxygen with nitrogen, and purged with nitrogen while the reaction vessel was heated to the induction temperature of 59° C. The nitrogen purge was stopped and the vessel was pressurized to 60 psi. The mixture polymerized adiabatically and the temperature peaked at 127° C. The mixture was isothermally held at that temperature for 60 minutes. The reaction mixture was drained from the reaction vessel into an 8 ounce jar. The product of Preparatory Example 10 (P10) is referred to as Polymeric Crosslinker 7 (PC7).

Preparatory Example 11: Second (Meth)acrylate Copolymers PC8

The following components were charged to an 8 ounce glass jar: 92.92 grams IOA, 5.0 grams AA, 4.00 grams of 50 weight percent AeBP in ethyl acetate, 0.10 grams, 0.10 grams IRGANOX 1010, 0.90 grams of 11.1 weight percent IOTG in IOA, and 0.82 grams of 2.44 weight percent MeHQ in IOA. The mixture was agitated until all components were dissolved. Then 0.48 grams of 0.25 weight percent solids VAZO 52 in IOA was added to the glass jar. A portion (80 grams) of the final solution was then transferred to a stainless steel reaction vessel. The reaction vessel was sealed and purged of oxygen with nitrogen while heating. Upon reaching the induction temperature of 61° C., the nitrogen purge was stopped and the vessel was pressurized to 60 psi with nitrogen. The temperature peaked at 130° C. A sample was taken of the reaction mixture and the unreacted monomer was 55.71 percent based on the total weight of the mixture.

The following components were charged to a 4 ounce glass jar: 1.0 grams VAZO 52, 0.10 grams VAZO 88, 0.15 grams LUPERSOL 101, 0.25 grams LUPERSOL 130, and 48.50 grams ethyl acetate.

The solution was shaken in a reciprocating mixer until all solids were dissolved. Then 0.7 grams of the ethyl acetate solution, 0.30 grams of 11.1 weight percent IOTG in IOA, and 4.20 grams of 50 weight percent AeBP in ethyl acetate were added to the stainless steel reaction vessel and stirred with a wooden tongue depressor. The reaction vessel was then resealed, purged of oxygen with nitrogen, and purged with nitrogen while the reaction vessel was heated to the induction temperature of 59° C. The nitrogen purge was stopped and the vessel was pressurized to 60 psi. The mixture polymerized adiabatically and the temperature peaked at 135° C. The mixture was isothermally held at that temperature for 60 minutes. The reaction mixture was drained from the reaction vessel into an 8 ounce jar. The product of Preparatory Example 11 (P11) is referred to as Polymeric Crosslinker 8 (PC8).

Preparatory Example 12: Second (Meth)acrylate Copolymers PC9

The following components were charged to an 8 ounce glass jar: 93.00 grams IOA, 5.0 grams AA, 4.00 grams of 50 weight percent 4-acryloyl ethoxy benzophenone (AeBP) in ethyl acetate, 0.10 grams IRGANOX 1010, 0.78 grams of 7.69 weight percent IOTG in IOA, and 0.82 grams of 2.44 weight percent MeHQ in IOA. The mixture was agitated until all components were dissolved. Then 0.48 grams of 0.25 weight percent solids VAZO 52 in IOA was added to the glass jar. A portion (80 grams) of the final solution was then transferred to a stainless steel reaction vessel. The reaction vessel was sealed and purged of oxygen with nitrogen while heating. Upon reaching the induction temperature of 61° C., the nitrogen purge was stopped and the vessel was pressurized to 60 psi with nitrogen. The temperature peaked at 130° C. A sample was taken of the reaction mixture and the unreacted monomer was 45.31 percent based on the total weight of the mixture.

The following components were charged to a 4 ounce glass jar: 1.0 grams VAZO 52, 0.10 grams VAZO 88, 0.20 grams LUPERSOL 101, 0.20 grams LUPERSOL 130, and 48.50 grams ethyl acetate. The solution was shaken in a reciprocating mixer until all solids were dissolved. Then 0.7 grams of the ethyl acetate solution, 0.30 grams of 11.1 weight percent IOTG in IOA, and 4.20 grams of 50 weight percent AeBP in ethyl acetate were added to the stainless steel reaction vessel and stirred with a wooden tongue depressor. The reaction vessel was then resealed, purged of oxygen with nitrogen, and purged with nitrogen while the reaction vessel was heated to the induction temperature of 59° C. The nitrogen purge was stopped and the vessel was pressurized to 60 psi. The mixture polymerized adiabatically and the temperature peaked at 150° C. The mixture was isothermally held at that temperature for 60 minutes. The reaction mixture was drained from the reaction vessel into an 8 ounce jar. The product of Preparatory Example 12 (P12) is referred to as Polymeric Crosslinker 9 (PC9).

Preparatory Example 13: Second (Meth)acrylate Copolymers PC10

The following components were charged to an 8 ounce glass jar: 93.00 grams IOA, 5.0 grams Acm, 0.10 grams IRGANOX 1010, 0.78 grams of 7.69 weight percent IOTG in IOA, 5.00 grams of isopropanol, 6.00 grams of 50 weight percent AeBP in ethyl acetate, and 0.82 grams of 2.44 weight percent MeHQ in IOA. The mixture was agitated until all components were dissolved. Then 0.48 grams of 0.25 weight percent solids VAZO 52 in IOA was added to the glass jar. A portion (80 grams) of the final solution was then transferred to a stainless steel reaction vessel. The reaction vessel was sealed and purged of oxygen with nitrogen while heating. Upon reaching the induction temperature of 61° C., the nitrogen purge was stopped and the vessel was pressurized to 60 psi with nitrogen. The temperature peaked at 128° C. A sample was taken of the reaction mixture and the unreacted monomer was 73.03 percent based on the total weight of the mixture.

The following components were charged to a 4 ounce glass jar: 1.0 grams VAZO 52, 0.10 grams VAZO 88, 0.20 grams LUPERSOL 101, 0.20 grams LUPERSOL 130, and 48.50 grams ethyl acetate. The solution was shaken in a reciprocating mixer until all solids were dissolved. Then 0.7 grams of the ethyl acetate solution, 0.26 grams of 11.1 weight percent IOTG in IOA and 2.20 grams of 50 weight percent AeBP in ethyl acetate were added to the stainless steel reaction vessel and stirred with a wooden tongue depressor. The reaction vessel was then resealed, purged of oxygen with nitrogen, and purged with nitrogen while the reaction vessel was heated to the induction temperature of 59° C. The nitrogen purge was stopped and the vessel was pressurized to 60 psi. The mixture polymerized adiabatically and the temperature peaked at 146° C. The mixture was isothermally held at that temperature for 60 minutes. The reaction mixture was drained from the reaction vessel into an 8 ounce jar. The product of Preparatory Example 13 (P13) is referred to as Polymeric Crosslinker 10 (PC10).

Preparatory Example 14: Second (Meth)acrylate Copolymers PC11

The following components were added to a 1 liter amber jar: 180 grams IOA, 10.0 grams Acm, 10.00 grams of 50 weight percent AeBP in ethyl acetate, 1.0 grams of a 23.0 weight percent solution of IOTG in ethyl acetate, 2.0 gram of 20 weight percent VAZO 67 in ethyl acetate, and 287 grams of ethyl acetate. The bottle was purged with 1.5 L/min nitrogen gas for a minimum of 120 seconds to remove any residual oxygen before being capped and sealed. The sealed bottle was then mounted into a launderometer water bath and heated to 60° C. and mechanically rotated during reaction. The reaction was allowed to proceed for 18-24 hours before being removed from the laundrometer water bath and allowed to cool to room temperature. Volatiles were evaporated in a forced air oven. The product of Preparatory Example 14 (P14) is referred to as Polymeric Crosslinker 11 (PC11).

Preparatory Example 15: Second (Meth)acrylate Copolymers PC12

The following components were added to a 1 liter amber jar: 180 grams IOA, 10.0 grams NNDMA, 10.00 grams of 50 weight percent AeBP in ethyl acetate, 1.0 grams of a 9.20 weight percent solution of IOTG in ethyl acetate, 2.0 gram of 20 weight percent VAZO 67 in ethyl acetate, and 287 grams of ethyl acetate. The bottle was purged with 1.5 L/min nitrogen gas for a minimum of 120 seconds to remove any residual oxygen before being capped and sealed. The sealed bottle was then mounted into a laundrometer water bath and heated to 60° C. and mechanically rotated during reaction. The reaction was allowed to proceed for 18-24 hours before being removed from the laundrometer water bath and allowed to cool to room temperature. Volatiles were evaporated in a forced air oven. The product of Preparatory Example 15 (P15) is referred to as Polymeric Crosslinker 12 (PC12).

Preparatory Example 16: Second (Meth)acrylate Copolymers PC13

The following components were added to a 1 liter amber jar: 180 grams IOA, 10.0 grams Acm, 10.00 grams of 50 weight percent AeBP in ethyl acetate, 1.0 grams of a 6.00 weight percent solution of IOTG in ethyl acetate, 2.0 gram of 20 weight percent VAZO 67 in EtOAc, and 287 grams of ethyl acetate. The bottle was purged with 1.5 L/min nitrogen gas for a minimum of 120 seconds to remove any residual oxygen before being capped and sealed. The sealed bottle was then mounted into a laundrometer water bath and heated to 60° C. and mechanically rotated during reaction. The reaction was allowed to proceed for 18-24 hours before being removed from the laundrometer water bath and allowed to cool to room temperature. Volatiles were evaporated in a forced air oven. The product of Preparatory Example 16 (P16) is referred to as Polymeric Crosslinker 13 (PC13).

Preparatory Example 17: Second (Meth)acrylate Copolymers PC14

The following components were added to a 1 liter amber jar: 180 grams IOA, 10.0 grams NNDMA, 10.00 grams of 50 weight percent AeBP in ethyl acetate, 1.0 grams of a 3.00 weight percent solution of IOTG in EtOAc, 2.0 gram of 20 weight percent VAZO 67 in ethyl acetate, and 287 grams of ethyl acetate. The bottle was purged with 1.5 L/min nitrogen gas for a minimum of 120 seconds to remove any residual oxygen before being capped and sealed. The sealed bottle was then mounted into a laundrometer water bath and heated to 60° C. and mechanically rotated during reaction. The reaction was allowed to proceed for 18-24 hours before being removed from the laundrometer water bath and allowed to cool to room temperature. Volatiles were evaporated in a forced air oven. The product of Preparatory Example 17 (P17) is referred to as Polymeric Crosslinker 14 (PC14).

TABLE 3

Formulations for Second (Meth)acrylate Copolymers

| Prep Example | Second (Meth)acrylate Copolymer | IOA (wt %) | AA (wt %) | ACM (wt %) | NNDMA (wt %) | AeBP (wt %) | ABP (wt %) | IOTG (pph) | Mw (kg/mol) |
|---|---|---|---|---|---|---|---|---|---|
| P4 | PC1 | 92 | 5.0 | — | — | — | 3 | 0.3 | 104 |
| P5 | PC2 | 90 | 5.0 | — | — | 5 | — | 1.2 | 31 |
| P6 | PC3 | 90 | 5.0 | — | — | 5 | — | 0.075 | 464 |
| P7 | PC4 | 90 | 5.0 | — | — | 5 | — | 0.045 | 642 |
| P8 | PC5 | 90 | 5.0 | — | — | 5 | — | 0.03 | 855 |
| P9 | PC6 | 85 | 5.0 | — | — | 10.0 | — | 0.045 | 600 |
| P10 | PC7 | 90 | 5.0 | — | — | 5 | — | 0.3 | 137 |
| P11 | PC8 | 90 | 5.0 | — | — | 5 | — | 0.15 | 267 |
| P12 | PC9 | 90 | 5.0 | — | — | 5 | — | 0.09 | 377 |
| P13 | PC10 | 90 | — | 5.0 | — | 5 | — | 0.09 | 295 |
| P14 | PC11 | 90 | — | 5.0 | — | 5 | — | 0.115 | 1060 |
| P15 | PC12 | 90 | — | — | 5.0 | 5 | — | 0.046 | 1180 |
| P16 | PC13 | 90 | — | 5.0 | — | 5 | — | 0.030 | 995 |
| P17 | PC14 | 90 | — | — | 5.0 | 5 | — | 0.015 | 1230 |

Comparative Examples 1-10 (CE1-CE10): Non-Tackified Adhesive Formulations

The first and second (meth)acrylate copolymers were hot melt blended using a small scale twin screw extruder and then coated onto release liners using a 6 inch wide drop die. The extrusion temperature for the die and extruder were kept at 300° F. The line speed of the coater was kept constant at 5 feet/minute. All samples were coated to 2 mil (50 micrometers) thickness unless otherwise specified onto a standard polykraft coated paper release carrier. The samples were then transferred onto Mitsubishi 3SAB PET film (Mitsubishi, Greer, S.C., USA) and UV cured with the indicated dose of UV-C radiation using a UV processor from American Ultraviolet Co. (Murray Hill, N.J., USA). The processor contains two medium pressure mercury arc lamps, each of which was operated at a power level of 200 Watts/in. The line speed was adjusted to achieve the desired dose in the UV-C spectral region.

TABLE 4

Formulations and Performance of Non-Tackified Adhesives

| Example | First (Meth)acrylate Copolymer Type | First (Meth)acrylate Copolymer (wt %) | Second (Meth)acrylate Copolymer Type | Second (Meth)acrylate Copolymer (wt %) | FORAL 3085 (wt %) | UV Cure Dose (UV-C) (mJ/cm2) | Peel Force (oz./0.5 in.) | 70° C. Shear Hold (min) | Gel Content (%) |
|---|---|---|---|---|---|---|---|---|---|
| CE1 | B1 | 100 | — | 0 | 0 | 30 | 26.5 | 2 | 11 |
| CE2 | B1 | 100 | — | 0 | 0 | 60 | — | 2 | |
| CE3 | B2 | 100 | — | 0 | 0 | 30 | 22.3 | +10,000 | 73 |
| CE4 | B2 | 100 | — | 0 | 0 | 60 | — | +10,000 | |
| CE5 | B1 | 95 | PC1 | 5 | 0 | 30 | 18.7 | +10,000 | 78 |
| CE6 | B1 | 95 | PC1 | 5 | 0 | 60 | — | +10,000 | |
| CE7 | B1 | 97 | PC2 | 3 | 0 | 30 | — | +10,000 | |
| CE8 | B1 | 97 | PC2 | 3 | 0 | 60 | — | +10,000 | |
| CE9 | B1 | 94 | PC2 | 6 | 0 | 30 | — | +10,000 | |
| CE10 | B1 | 94 | PC2 | 6 | 0 | 60 | — | +10,000 | |

In the comparative examples of Table 4, samples without the second (meth)acrylate copolymer and without UV crosslinkable groups in the first (meth)acrylate copolymer show very little cohesive strength as indicated by the poor shear performance. However, samples with UV crosslinkable groups in the first (meth)acrylate copolymer (CE3-CE4) as well as samples with the second (meth)acrylate copolymers containing significant amounts of UV crosslinkable groups (CE5-CE10) show excellent cohesive strength and shear performance. None of these samples contain tackifiers.

Examples 1-14 and Comparative Example 11-22 (CE11-CE22): Tackified Adhesive Formulations Examples in Table 5 below were prepared in a similar fashion to those in Table 4 above with the addition of tackifier (FORAL 3085) in the formulation. The tackifier was added directly into the extruder along with the (meth)acrylate copolymer(s). All extruder and coating conditions, substrates, and curing equipment in the previous examples were repeated.

The inverse of the crosslink density, which is referred to in Table 5 as "kg per mole crosslinker" was calculated using the following equation.

$$(W1+W2) \div \{[(W1 \cdot X1/100)/MX1 + (W2 \cdot X2/100)/MX2] \cdot 1000\}$$

In this equation,

W1 is the mass in grams of the first (meth)acrylate copolymer;

W2 is the mass in grams of the second (meth)acrylate copolymer;

X1 is the weight percent of the UV crosslinking monomer in the first (meth)acrylate copolymer;

X2 is the weight percent of the UV crosslinking monomer in the second (meth)acrylate copolymer;

MX1 is the molecular weight in grams/mole of the UV crosslinking monomer in the first (meth)acrylate copolymer; and MX2 is the molecular weight in grams/mole of the UV crosslinking monomer in the second (meth)acrylate copolymer.

TABLE 5

Formulations and Performance of Tackified Adhesives

| Example | First (Meth)acrylate Copolymer Type | First (Meth)acrylate Copolymer (wt %) | Second (Meth)acrylate Copolymer Type | Second (Meth)acrylate Copolymer (wt %) | FORAL 3085 (wt %) | UV Cure Dose UV-C (mJ/cm2) | Coating Thickness (mil) | 70° C. Shear Hold (min) | Gel Content (%) | Kg (meth)acrylate copolymer per mole UV crosslinker |
|---|---|---|---|---|---|---|---|---|---|---|
| CE11 | B2 | 66.7 | — | 0 | 33.3 | 30 | 2 | 37 | 40 | 252 |
| CE12 | B2 | 66.7 | — | 0 | 33.3 | 60 | 2 | 40 | | 252 |
| CE13 | B3 | 62.5 | — | 0 | 37.5 | 27 | 2 | 221 | | 126 |
| CE14 | B3 | 62.5 | — | 0 | 37.5 | 35 | 2 | 453 | | 126 |
| CE15 | B1 | 64.7 | PC2 | 2.0 | 33.3 | 30 | 2 | 4 | 25 | 197 |
| CE16 | B1 | 64.7 | PC2 | 2.0 | 33.3 | 60 | 2 | 2 | | 197 |
| CE17 | B1 | 62.7 | PC2 | 4.0 | 33.3 | 30 | 2 | 52 | 40 | 99 |
| CE18 | B1 | 62.7 | PC2 | 4.0 | 33.3 | 60 | 2 | 165 | | 99 |
| CE19 | B1 | 58.7 | PC2 | 8.0 | 33.3 | 60 | 2 | 34 | 47 | 49 |
| CE20 | B1 | 58.7 | PC2 | 8.0 | 33.3 | 60 | 2 | 143 | | 49 |
| CE21 | B1 | 64.7 | PC3 | 2.0 | 33.3 | 30 | 2 | 37 | 31 | 197 |
| CE22 | B1 | 64.7 | PC3 | 2.0 | 33.3 | 60 | 2 | 49 | | 197 |
| E1 | B1 | 62.7 | PC3 | 4.0 | 33.3 | 30 | 2 | 456 | 41 | 99 |
| E2 | B1 | 62.7 | PC3 | 4.0 | 33.3 | 60 | 2 | 517 | | 99 |
| E3 | B1 | 58.7 | PC3 | 8.0 | 33.3 | 30 | 2 | +10,000 | 54 | 49 |
| E4 | B1 | 58.7 | PC3 | 8.0 | 33.3 | 60 | 2 | +10,000 | | 49 |
| E5 | B1 | 62.7 | PC4 | 4.0 | 33.3 | 30 | 2 | +10,000 | 42 | 99 |
| E6 | B1 | 62.7 | PC4 | 4.0 | 33.3 | 60 | 2 | +10,000 | | 99 |
| E7 | B2 | 62.7 | PC3 | 4.0 | 33.3 | 30 | 2 | +10,000 | 52 | 72 |
| E8 | B2 | 62.7 | PC3 | 4.0 | 33.3 | 60 | 2 | +10,000 | | 72 |
| E9 | B3 | 60.9 | PC5 | 1.6 | 37.5 | 27 | 3 | 166 | | 83 |

TABLE 5-continued

Formulations and Performance of Tackified Adhesives

| Example | First (Meth)acrylate Copolymer Type | First (Meth)acrylate Copolymer (wt %) | Second (Meth)acrylate Copolymer Type | Second (Meth)acrylate Copolymer (wt %) | FORAL 3085 (wt %) | UV Cure Dose UV-C (mJ/cm2) | Coating Thickness (mil) | 70° C. Shear Hold (min) | Gel Content (%) | Kg (meth)acrylate copolymer per mole UV crosslinker |
|---|---|---|---|---|---|---|---|---|---|---|
| E10 | B3 | 60.9 | PC5 | 1.6 | 37.5 | 35 | 3 | +10,000 | | 83 |
| E11 | B3 | 59.4 | PC5 | 3.1 | 37.5 | 27 | 3 | 4522 | | 63 |
| E12 | B3 | 59.4 | PC5 | 3.1 | 37.5 | 35 | 3 | +10,000 | | 63 |
| E13 | B3 | 59.4 | PC6 | 3.1 | 37.5 | 27 | 3 | +10,000 | | 41 |
| E14 | B3 | 59.4 | PC6 | 3.1 | 37.5 | 35 | 3 | +10,000 | | 41 |
| E15 | B1 | 58.7 | PC7 | 8.0 | 33.3 | 30 | 2 | +10000 | | 49 |
| E16 | B1 | 58.7 | PC7 | 8.0 | 33.3 | 60 | 2 | +10000 | | 49 |
| E17 | B1 | 58.7 | PC8 | 8.0 | 33.3 | 60 | 2 | +10000 | | 49 |
| E18 | B1 | 58.7 | PC9 | 8.0 | 33.3 | 30 | 2 | +10000 | | 49 |
| E19 | B1 | 58.7 | PC9 | 8.0 | 33.3 | 60 | 2 | +10000 | | 49 |
| E20 | B4 | 58.7 | PC10 | 8.0 | 33.3 | 30 | 2 | +10000 | | 49 |
| E21 | B4 | 58.7 | PC10 | 8.0 | 33.3 | 60 | 2 | +10000 | | 49 |
| E22 | B1 | 58.7 | PC7 | 8.0 | 33.3 | 30 | 3 | +10000 | | 49 |
| E23 | B1 | 58.7 | PC7 | 8.0 | 33.3 | 60 | 3 | +10000 | | 49 |
| E24 | B1 | 58.7 | PC8 | 8.0 | 33.3 | 30 | 3 | +10000 | | 49 |
| E25 | B1 | 58.7 | PC8 | 8.0 | 33.3 | 60 | 3 | +10000 | | 49 |
| E26 | B1 | 58.7 | PC9 | 8.0 | 33.3 | 30 | 3 | +10000 | | 49 |
| E27 | B1 | 58.7 | PC9 | 8.0 | 33.3 | 60 | 3 | +10000 | | 49 |
| E28 | B4 | 58.7 | PC10 | 8.0 | 33.3 | 30 | 4 | +10000 | | 49 |
| E29 | B4 | 58.7 | PC10 | 8.0 | 33.3 | 60 | 4 | +10000 | | 49 |
| E30 | B5 | 60.9 | PC11 | 1.6 | 37.5 | 27 | 2 | 2368 | | 83 |
| E31 | B5 | 60.9 | PC11 | 1.6 | 37.5 | 35 | 2 | 5905 | | 83 |
| E32 | B5 | 60.9 | PC11 | 1.6 | 37.5 | 27 | 4 | 6675 | | 83 |
| E33 | B5 | 59.4 | PC13 | 3.1 | 37.5 | 27 | 2 | +10000 | | 63 |
| E34 | B5 | 59.4 | PC12 | 3.1 | 37.5 | 27 | 2 | 6211 | | 63 |
| E35 | B5 | 59.4 | PC12 | 3.1 | 37.5 | 35 | 2 | +10000 | | 63 |
| E36 | B5 | 59.4 | PC12 | 3.1 | 37.5 | 27 | 4 | +10000 | | 63 |
| E37 | B5 | 59.4 | PC14 | 3.1 | 37.5 | 27 | 2 | +10000 | | 63 |

Comparative Examples 11 to 14 have UV crosslinkable groups in the first (meth)acrylate copolymer but do not contain a second (meth)acrylate copolymer. These samples have poor shear performance.

Comparative Examples 15 to 20 have both a first (meth)acrylate copolymer and a second (meth)acrylate copolymer. The second (meth)acrylate copolymer has a molecular weight of only 31 kDa. Only the second (meth)acrylate copolymer has UV crosslinkable groups.

Comparative Examples 21 and 22 have both a first (meth)acrylate copolymer and a second (meth)acrylate copolymer. The crosslinking density is too low (i.e., total weight of (meth)acrylate copolymer divided by moles of UV crosslinkable monomer is greater than 150 kg per mole).

Examples 1 to 37 contain both a first (meth)acrylate copolymer and a second (meth)acrylate copolymer. The second (meth)acrylate copolymer has a molecular weight equal to at least 137,000 Daltons. Examples 1 to 6, 15 to 19, and 22 to 27 contain UV crosslinkable groups only in the second (meth)acrylate copolymer. The shear performance is enhanced as the molecular weight of the second (meth) acrylate acrylic crosslinker is increased and/or the amount of the second (meth)acrylate copolymer in the formulation is increased. Examples 7 to 14, 20 to 21, and 28 to 37 contain UV crosslinkable groups in both the first and second (meth) acrylate copolymer. Provided sufficient amount of the second (meth)acrylate acrylic crosslinker and UV radiation was used, these samples had excellent shear performance.

We claim:

1. A crosslinkable composition comprising:
1) at least different two (meth)acrylate copolymers comprising
   a) a first (meth)acrylate copolymer having a weight average molecular weight greater than or equal to at least 100,000 Daltons, wherein the first (meth)acrylate copolymer is a reaction product of a first monomer mixture comprising
      (i) an alkyl (meth)acrylate; and
      (ii) an optional UV crosslinking monomer having an aromatic ketone group that is crosslinkable when exposed to ultraviolet radiation, wherein the UV crosslinking monomer is present in an amount in a range of 0 to 0.3 mole percent based on total moles of monomer in the first monomer mixture; and
   b) a second (meth)acrylate copolymer having a weight average molecular weight greater than or equal to 100,000 Daltons, wherein the second (meth)acrylate copolymer is a reaction product of a second monomer mixture comprising
      (i) an alkyl (meth)acrylate; and
      (ii) a UV crosslinking monomer having an aromatic ketone group that is crosslinkable when exposed to ultraviolet radiation, wherein the UV crosslinking monomer is present in an amount equal to at least 1 mole percent based on total moles of monomer in the second monomer mixture,
   wherein total weight of the (meth)acrylate copolymers in kilograms divided by total moles of UV crosslinker used to form the (meth)acrylate copolymers is no greater than 150 kilograms per mole; and
2) a tackifier in an amount equal to at least 20 weight percent based on a total weight of solids in the crosslinkable composition.

2. The crosslinkable composition of claim 1, wherein the first (meth)acrylate copolymer is present in an amount in a range of 80 to 98 weight percent and the second (meth)acrylate copolymer is present in an amount in a range of 2 to 20 weight percent based on a total weight of (meth)acrylate copolymers in the crosslinkable composition.

3. The crosslinkable composition of claim 1, wherein the weight average molecular weight of the second (meth)acrylate copolymer is greater than 500,000 Daltons.

4. The crosslinkable composition of claim 1, wherein the UV crosslinking monomer in the second monomer mixture and the optional UV crosslinking monomer in the first monomer mixture is a benzophenone-containing monomer.

5. The crosslinkable composition of claim 1, wherein the first monomer mixture further comprises a polar monomer, the second monomer mixture further comprises a polar monomer, or both.

6. The crosslinkable composition of claim 1, wherein the UV crosslinking monomer in the first monomer mixture is present in an amount in a range of 0.01 to 0.3 based on total moles of monomer in the first monomer mixture.

7. The crosslinkable composition of claim 1, wherein the first reaction mixture further comprises a polar monomer having an acid group and the second monomer mixture further comprises a polar monomer having a basic group or wherein the first reaction mixture further comprises a polar monomer having a basic group and the second monomer mixture further comprises a polar monomer having an acidic group.

8. An article comprising:
a substrate; and
a coating of a crosslinkable composition positioned adjacent to the substrate, the crosslinkable composition comprising
1) at least two different (meth)acrylate copolymers comprising
a) a first (meth)acrylate copolymer having a weight average molecular weight greater than or equal to at least 100,000 Daltons, wherein the first (meth)acrylate copolymer is a reaction product of a first monomer mixture comprising
(i) an alkyl (meth)acrylate; and
(ii) an optional UV crosslinking monomer having an aromatic ketone group that is crosslinkable when exposed to ultraviolet radiation, wherein the UV crosslinking monomer is present in an amount in a range of 0 to 0.3 mole percent based on total moles of monomer in the first monomer mixture; and
b) a second (meth)acrylate copolymer having a weight average molecular weight greater than or equal to 100,000 Daltons, wherein the second (meth)acrylate copolymer is a reaction product of a second monomer mixture comprising
(i) an alkyl (meth)acrylate; and
(ii) a UV crosslinking monomer having an aromatic ketone group that is crosslinkable when exposed to ultraviolet radiation, wherein the UV crosslinking monomer is present in an amount equal to at least 1 mole percent based on total moles of monomer in the second monomer mixture,
wherein a total weight of the (meth)acrylate copolymers in kilograms divided by a total moles of UV crosslinker in the (meth)acrylate copolymers is no greater than 150 kilograms per mole; and
2) a tackifier in an amount equal to at least 20 weight percent based on a total weight of solids in the crosslinkable composition.

9. The article of claim 8, wherein the weight average molecular weight of the second (meth)acrylate copolymer is greater than 500,000 Daltons.

10. A crosslinked composition comprising a reaction product of a crosslinkable composition exposed to ultraviolet radiation, the crosslinkable composition comprising:
1) at least two different (meth)acrylate copolymers comprising
a) a first (meth)acrylate copolymer having a weight average molecular weight greater than or equal to at least 100,000 Daltons, wherein the first (meth)acrylate copolymer is a reaction product of a first monomer mixture comprising
(i) an alkyl (meth)acrylate; and
(ii) an optional UV crosslinking monomer having an aromatic ketone group that is crosslinkable when exposed to ultraviolet radiation, wherein the UV crosslinking monomer is present in an amount in a range of 0 to 0.3 mole percent based on total moles of monomer in the first monomer mixture; and
b) a second (meth)acrylate copolymer having a weight average molecular weight greater than or equal to 100,000 Daltons, wherein the second (meth)acrylate copolymer is a reaction product of a second monomer mixture comprising
(i) an alkyl (meth)acrylate; and
(ii) a UV crosslinking monomer having an aromatic ketone group that is crosslinkable when exposed to ultraviolet radiation, wherein the UV crosslinking monomer is present in an amount equal to at least 1 mole percent based on total moles of monomer in the second monomer mixture,
wherein a total weight of the (meth)acrylate copolymers in kilograms divided by a total moles of UV crosslinker in the (meth)acrylate copolymers is no greater than 150 kilograms per mole; and
2) a tackifier in an amount equal to at least 20 weight percent based on a total weight of solids in the crosslinkable composition.

11. The crosslinked composition of claim 10, wherein the weight average molecular weight of the second (meth)acrylate copolymer is greater than 500,000 Daltons.

12. The crosslinked composition of claim 10, wherein the first monomer mixture further comprises a polar monomer, the second monomer mixture further comprises a polar monomer, or both.

13. An article comprising:
a substrate; and
a coating of a crosslinked composition positioned adjacent to the substrate, the crosslinked composition comprising a reaction product of a crosslinkable composition exposed to ultraviolet radiation, the crosslinkable composition comprising:
1) at least two different (meth)acrylate copolymers comprising
a) a first (meth)acrylate copolymer having a weight average molecular weight greater than or equal to at least 100,000 Daltons, wherein the first (meth)acrylate copolymer is a reaction product of a first monomer mixture comprising
(i) an alkyl (meth)acrylate; and
(ii) an optional UV crosslinking monomer having an aromatic ketone group that is crosslinkable when exposed to ultraviolet radiation, wherein the UV crosslinking monomer is present in an amount in a range of 0 to 0.3 mole percent based on total moles of monomer in the first monomer mixture; and b) a second (meth)acrylate copolymer having a weight average molecular weight greater than or equal to 100,000 Daltons, wherein the second (meth)acrylate copolymer is a reaction product of a second monomer mixture comprising
  (i) an alkyl (meth)acrylate; and
  (ii) a UV crosslinking monomer having an aromatic ketone group that is crosslinkable when exposed to ultraviolet radiation, wherein the UV crosslinking monomer is present in an amount equal to at least 1 mole percent based on total moles of monomer in the second monomer mixture, wherein a total weight of the (meth)acrylate copolymers in kilograms divided by a total moles of UV crosslinker in the (meth)acrylate copolymers is no greater than 150 kilograms per mole; and 2) a tackifier in an amount equal to at least 20 weight percent based on a total weight of solids in the crosslinkable composition.

14. The article of claim 13, wherein the weight average molecular weight of the second (meth)acrylate copolymer is greater than 500,000 Daltons.

15. A method of preparing an article, the method comprising:
  providing a substrate;
  positioning a crosslinkable composition adjacent to the substrate, wherein the crosslinkable composition comprises
    1) at least two different (meth)acrylate copolymers comprising
      a) a first (meth)acrylate copolymer having a weight average molecular weight greater than or equal to at least 100,000 Daltons, wherein the first (meth)acrylate copolymer is a reaction product of a first monomer mixture comprising
        (i) an alkyl (meth)acrylate; and
        (ii) an optional UV crosslinking monomer having an aromatic ketone group that is crosslinkable when exposed to ultraviolet radiation, wherein the UV crosslinking monomer is present in an amount in a range of 0 to 0.3 mole percent based on total moles of monomer in the first monomer mixture; and
      b) a second (meth)acrylate copolymer having a weight average molecular weight greater than or equal to 100,000 Daltons, wherein the second (meth)acrylate copolymer is a reaction product of a second monomer mixture comprising
        (i) an alkyl (meth)acrylate; and
        (ii) a UV crosslinking monomer having an aromatic ketone group that is crosslinkable when exposed to ultraviolet radiation, wherein the UV crosslinking monomer is present in an amount equal to at least 1 mole percent based on total moles of monomer in the second monomer mixture,
      wherein a total weight of the (meth)acrylate copolymers in kilograms divided by a total moles of UV crosslinker in the (meth)acrylate copolymers is no greater than 150 kilograms per mole; and
    2) a tackifier in an amount equal to at least 20 weight percent based on a total weight of solids in the crosslinkable composition; and
  exposing the crosslinkable composition to ultraviolet light to form a crosslinked composition.

* * * * *

UNITED STATES PATENT AND TRADEMARK OFFICE
CERTIFICATE OF CORRECTION

| | | |
|---|---|---|
| PATENT NO. | : 9,828,532 B2 | Page 1 of 1 |
| APPLICATION NO. | : 14/442600 | |
| DATED | : November 28, 2017 | |
| INVENTOR(S) | : Anish Kurian | |

It is certified that error appears in the above-identified patent and that said Letters Patent is hereby corrected as shown below:

Column 7
Line 8, delete "photoinitator" and insert -- photoinitiator --, therefor.

Column 9
Line 39, delete "calorimetry." and insert -- Calorimetry. --, therefor.

Column 14
Line 1, delete "pentaertythritol" and insert -- pentaerythritol --, therefor.
Line 24, delete "dicyclopenetadiene," and insert -- dicyclopentadiene, --, therefor.

Column 26
Line 65 (Table), delete "Chemitics" and insert -- Chemetics --, therefor.

Column 27
Line 25 (Table), delete "Dimethylacylamide" and insert -- Dimethylacrylamide --, therefor.

Column 29
Line 44, after "mixture" insert -- . --.

Signed and Sealed this
Fifteenth Day of May, 2018

Andrei Iancu
*Director of the United States Patent and Trademark Office*